(12) United States Patent
Kami

(10) Patent No.: US 10,341,978 B2
(45) Date of Patent: Jul. 2, 2019

(54) MOBILE MANAGEMENT SYSTEM, MOBILE MANAGEMENT SERVER, MOBILE MANAGEMENT METHOD AND MOBILE MANAGEMENT PROGRAM

(75) Inventor: Nobuharu Kami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 566 days.

(21) Appl. No.: 14/006,817

(22) PCT Filed: Mar. 1, 2012

(86) PCT No.: PCT/JP2012/055158
§ 371 (c)(1),
(2), (4) Date: Sep. 23, 2013

(87) PCT Pub. No.: WO2012/128011
PCT Pub. Date: Sep. 27, 2012

(65) Prior Publication Data
US 2014/0018099 A1    Jan. 16, 2014

(30) Foreign Application Priority Data
Mar. 22, 2011   (JP) ................................. 2011-062136

(51) Int. Cl.
*H04W 4/021*    (2018.01)
*H04W 64/00*    (2009.01)

(52) U.S. Cl.
CPC ........... *H04W 64/00* (2013.01); *H04W 4/022* (2013.01)

(58) Field of Classification Search
CPC .......................... H04W 64/003; H04W 64/006
(Continued)

(56) References Cited

U.S. PATENT DOCUMENTS

| | | | |
|---|---|---|---|
| 7,620,404 B2* | 11/2009 | Chesnais | H04W 4/02 455/414.2 |
| 2012/0150490 A1* | 6/2012 | Oyabu | G06Q 10/06 702/179 |
| 2013/0115961 A1* | 5/2013 | Shibayama | H04W 16/18 455/446 |

FOREIGN PATENT DOCUMENTS

| | | |
|---|---|---|
| JP | 2001-198989 A | 7/2001 |
| JP | 2002-342557 A | 11/2002 |

(Continued)

OTHER PUBLICATIONS

"Mobile Spatial Statics", Mobile Society Research Institute, NTT DOCOMO, Inc., Internet [retrieved on Sep. 20, 2013], <URL:http://www.moba-ken.jp/research/research2010/r10-01.html>. See cited Non-Patent Document 3 on p. 3 of translated Applicant's Specification for explanation of relevance.

(Continued)

*Primary Examiner* — Joshua L Schwartz

(57) ABSTRACT

A mobile node includes: a status acquiring unit for acquiring status information; and a communication module for transmitting the status information to a mobile management server. The mobile management server includes: an input/output unit for receiving the status information from the mobile node; a management data creating unit for analyzing changes in the distribution of the status information, thereby calculating, as characteristic parts, parts having high distribution densities; and a request processing unit for outputting information about the calculated characteristic part. The management data creating unit includes: a node data registering function for storing the status information; a label calculating function for calculating a label in which the status information is multiplexed; and a characteristic part extracting function for extracting, in descending order of (Continued)

distribution density, characteristic parts representative of parts having high label distribution densities.

10 Claims, 22 Drawing Sheets

(58) Field of Classification Search
USPC .......... 455/456.1, 456.2, 456.3, 456.4, 456.5
See application file for complete search history.

(56) References Cited

FOREIGN PATENT DOCUMENTS

| | | |
|---|---|---|
| JP | 2003-030373 A | 1/2003 |
| JP | 2006-331200 A | 12/2006 |
| JP | 2009-159336 A | 7/2009 |
| JP | 2010-501947 A | 1/2010 |
| JP | 2010-288009 A | 12/2010 |
| WO | 2005/038680 A1 | 4/2005 |
| WO | WO2011021608 * | 2/2011 |

OTHER PUBLICATIONS

"Crime Information Map", the Metropolitan Police Department, (retrieved on Sep. 19, 2013), Internet <URL: http://www3.wagamachi-guide.com/johomap.htm>. See cited Non-Patent Document 1 on p. 3 of the Applicant's Specification for explanation of relevance.

"The Japan Road Traffic Information Center", the Japan Road Traffic Information Center, (retrieved on Sep. 19, 2013), Internet <URL: http://www.jartic.or.jp/top.html>.See cited Non-Patent Document 2 on p. 3 of the Applicant's Specification for explanation of relevance.

Byers et al., "Nearest-neighbor clutter removal for estimating features in spatial point processes", Technical Report No. 305, Department of Statistics, University of Washington, Apr. 27, 1996, pp. 1-12. See cited Non-Patent Document 4 on p. 3 of the Applicant's Specification for explanation of relevance.

International Search Report for PCT Application No. PCT/JP2012/055158 dated Apr. 24, 2012.

* cited by examiner

FIG. 5

| LABELS | REGISTERED NODES |
|--------|------------------|
| $e_1$ | $\{x_1, x_3, \cdots\}$ |
| $e_2$ | $\{x_2, x_5, \cdots\}$ |
| | ⋮ |
| | ⋮ |
| $e_L$ | $\{x_{11}, x_{13}, \cdots\}$ |

FIG. 6A

| LABELS | POINTS |
|---|---|
| $\ell_1$ | $\{x_1, x_3, \ldots\}$ |
| $\ell_2$ | $\{x_2, x_5, \ldots\}$ |
| $\vdots$ | $\vdots$ |
| $\ell_L$ | $\{x_{11}, x_{13}, \ldots\}$ |

142

L : TOTAL NUMBER OF LABELS

| IDENTIFIER NUMBERS | ATTRIBUTE INFORMATION | | |
|---|---|---|---|
| | INFORMATION 1 | $\cdots\cdots$ | INFORMATION M |
| 1 | $A_{1,1}$ | $\cdots\cdots$ | $A_{1,M}$ |
| 2 | $A_{2,1}$ | $\cdots\cdots$ | $A_{2,M}$ |
| $\vdots$ | $\vdots$ | | $\vdots$ |
| K | $A_{K,1}$ | $\cdots\cdots$ | $A_{K,M}$ |

L : NUMBER OF PIECES OF CHARACTERISTIC INFORMATION EXTRACTED FROM LABEL n : NUMBER OF PIECES OF ATTRIBUTE INFORMATION EXTRACTED FROM LABEL $\begin{pmatrix} \text{INFORMATION 1: COORDINATE OF CENTER POINT} \\ \text{INFORMATION 2: NUMBER OF ELEMENTS} \\ \text{INFORMATION 3: SPREAD OF DISTRIBUTION} \\ \vdots \end{pmatrix}$ $A_{ij}$ : CHARACTERISTIC AMOUNT ($1 \leq i \leq K$, $1 \leq j \leq M$)

FIG. 15

| PARAMETERS | NUMERICAL VALUES |
|---|---|
| a | (RANDOM NUMBER) |
| r | (RANDOM NUMBER) |
| W | (PREDETERMINED VALUE) |
| C | (PREDETERMINED VALUE) |
| B | (PREDETERMINED VALUE) |

FIG. 18

| IDENTIFIER NUMBERS | CHARACTERISTIC INFORMATION | | |
|---|---|---|---|
| | SCORES | CENTER POSITIONS | SPREAD |
| 1 | 16 | (0.1, 0.3) | 0.05 |
| 2 | 10 | (0.4, 0.1) | 0.08 |
| 3 | 8 | (0.9, 0.2) | 0.1 |
| 4 | 7 | (0.5, 0.9) | 0.2 |

⋮

FIG. 19A
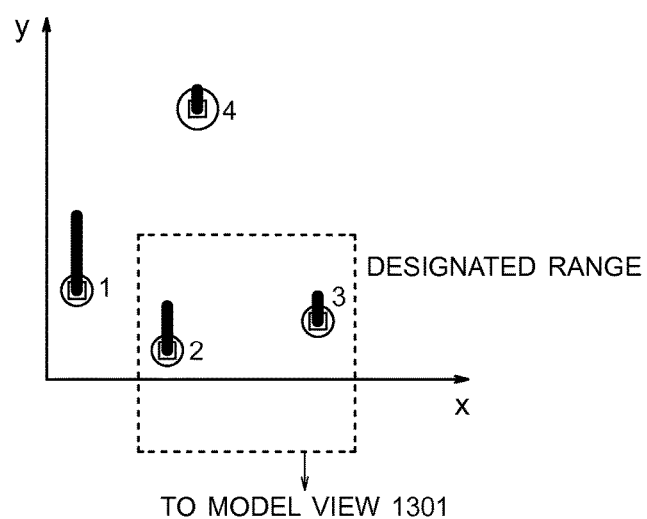
FIG. 19B
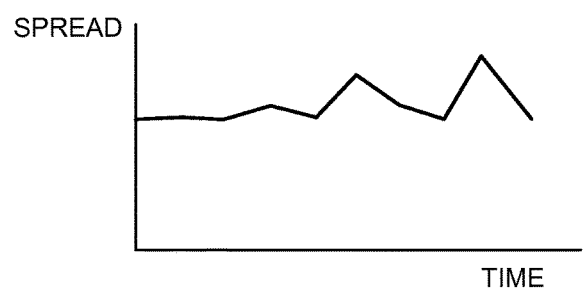

MODEL CHART 1301

FIG. 22A
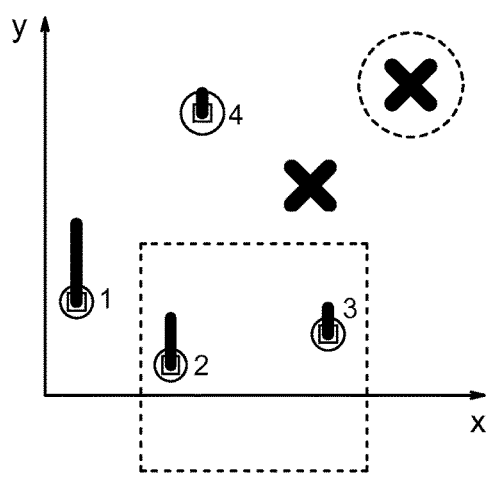
FIG. 22B
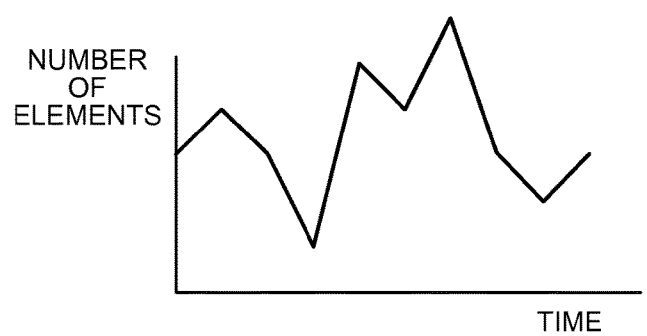

MOBILE MANAGEMENT SYSTEM, MOBILE MANAGEMENT SERVER, MOBILE MANAGEMENT METHOD AND MOBILE MANAGEMENT PROGRAM

This application is a National Stage Entry of PCT/JP2012/055158 filed Mar. 1, 2012, which claims priority from Japanese Patent Application 2011-062136 filed Mar. 22, 2011, the contents of all of which are incorporated herein by reference, in their entirety.

TECHNICAL FIELD

The present invention relates to a mobile management system, a mobile management server, a mobile management method, and a mobile management program. More specifically, the present invention relates to a mobile management system and the like capable of executing calculations regarding the density of mobile nodes promptly.

BACKGROUND ART

The mobile management system is a system that acquires the distribution in statuses typified by space coordinates such as current positions of the mobile units, and executes various kinds of statistical processing based thereupon. As the typical one, for example, frequency of the occurrence of crimes can be shown on a map in a unit of city, town, and village in various viewpoints such as "by each city, town, village", "by each type of crimes", etc., on the website of Non-Patent Document 1.

Further, as shown on the website of Non-Patent Document 2, it is possible to show traffic jam information of roads on a map based on positional information of each car running on the roads. In that case, it is possible to display the roads with different colors according to the extent of the jammed states. There are also marks for each region, types of the roads, and the like. This does not simply show the states of the current traffic jam on the roads but is also utilized for prediction of traffic jams and the like.

Further, depicted in Non-Patent Document 3 is a mobile management system which acquires current positions of each mobile unit by utilizing positional information acquired by each of the mobile units such as mobile phone terminals with GPS (Global Positioning System), Wi-Fi (Wireless Fidelty), and the like, and takes the positional information of a great number of mobile units as macro information. It is expected to be utilized for urban planning and the like through taking the positional information as the macro information and analyzing the behavior thereof. Depicted in Non-Patent Document 4 is K-th nearest neighbor clustering that is one of well-known methods regarding detection of distance distribution (will be described later in more details).

Depicted in Patent Document 1 is an information distribution service which predicts the distribution state of a mobile information terminal having specific user attribution. Depicted in Patent Document 2 is a technique which forms a micro machine in a specific layout pattern. Depicted in Patent Document 3 is a technique which acquires "presence information" that shows the status of the user of a mobile terminal from the communication status of the mobile terminal.

Depicted in Patent Document 4 is a behavior grasping device which grasps the behavior of a user based on the time of starting and terminating communication with an access point of a radio LAN. Depicted in Patent Document 5 is a radio communication system which selects a system to be used from a plurality of radio systems. Depicted in Patent Document 6 is a technique for classifying the attribute of consumers.

Patent Document 1: WO 2005/038680
Patent Document 2: Japanese Unexamined Patent Publication 2001-198989
Patent Document 3: Japanese Unexamined Patent Publication 2006-331200
Patent Document 4: Japanese Unexamined Patent Publication 2009-159336
Patent Document 5: Japanese Unexamined Patent Publication 2010-288009
Patent Document 6: Japanese Patent Application Publication 2010-5101947
Non-Patent Document 1: "Crime Information Map", the Metropolitan Police Department, (Searched on Jan. 27, 2011), Internet <URL: http://www.keishicho.metro.tokyo.jp/toukei/johomap/johomap.htm>
Non-Patent Document 2: "the Japan Road Traffic Information Center", the Japan Road Traffic Information Center, (Searched on Jan. 27, 2011) Internet <URL: http://www.jartic.or.jp/>
Non-Patent Document 3: "Mobile Spatial Statistics", Mobile Society Research Institute (NTT Docomo), (Searched on Jan. 27, 2011), Internet <URL: http:www.moba.ken.jp/research/research2010/r10_01>
Non-Patent Document 4: "Nearest-neighborclutter removal for estimating features in spatial point processes" Byers, S. D., and Raftery, A. E. 1998. Journal of American Statistical Association, 93 (442), pp. 577-584

The mobile management systems shown in Non-Patent Documents 1 to 3 generally requires a considerable amount of time for executing processing since a large scale of calculations are executed therein. For example, when it is desired to detect places where crimes, traffic jams, and the like are likely to occur, highly populated places, and the like, processing for dividing the target space into small sections and for creating histograms for each of the sections is required.

When the sectioning is done regularly such as in a tetragonal lattice form, the processing is simple. However, considering that the geographical positioning of the cities, towns, and villages as well as roads and the like greatly influence the result, simple sectioning such as the tetragonal lattice form may not be suitable to be used in some cases. It is because when border lines between the sections overlap on the part of high occurrence frequency, the occurrence frequency is divided roughly in half into two sections. As a result, the numerical value of the peak of the occurrence frequency is reduced to a half of that value.

Through detecting areas having a small distance between each of the nodes by finding the distance distribution of each of the terminals (nodes) without doing such sectioning, it is possible to identify the region where many nodes are aggregated without having the problems generated due to the sectioning. However, provided that the total number of the nodes is N, a calculation amount on the order of square of N is required for the processing. Therefore, it is not suited especially for a large-scaled mobile management system with which N is a huge number.

Further, it is also considered to employ a method which: assumes that the distance distribution of each of the nodes conform to a specific distribution model such as a Poisson point process; assumes that there is a difference in the generation rates of the points between a high density part and other parts; and detects only the high density part by comparing the fidelity to the distribution. Specifically, it is a method such as the K-th nearest neighbor clustering depicted in Non-Patent Document 4, which: assumes that the distribution of the distance to the node that is K-th closest conforms to Poisson distribution; and detects the part with a different generation rate by executing clustering. Other distribution models can also be utilized.

However, such method is also the processing that generally requires a large calculation amount. Thus, when the total number N of the nodes is increased, the calculation amount is increased exponentially. Therefore, such method is not suited for a large-scaled mobile management system, either. Especially, it is unsuitable for the cases where real-time display, operability, and the like are required (e.g., case of traffic jam information in Non-Patent Document 2, case of displaying behaviors of the user of a mobile phone terminal in a real-time manner as in Non-Patent Document 3).

Further, positional information of each node is used for specifying the behavior of the user of each node. Thus, in terms of protecting the privacy and protecting personal information, there may be cases where it is required to perform processing (processing for making it unidentifiable) on the information content so that node (user) cannot be identified therefrom. When this processing is performed on the server side, the calculation amount is increased further.

Techniques capable of overcoming such issues are not depicted in Patent Documents 1 to 6 described above, either. Patent Document 1 is a technique which predicts positional information of mobile units. However, it does not include a structure for making it efficient to perform the calculation. The techniques of Patent Documents 2 to 6 are not originally targeted for that, and any content for enabling it to be converted to be used for such object is not depicted therein.

An object of the present invention is to provide a mobile management system, a mobile management server, a mobile management method, and a mobile management program capable of reducing the calculation amount for the positional information and performing analysis of the positional information quickly and in a real-time manner.

DISCLOSURE OF THE INVENTION

In order to achieve the foregoing object, the mobile management system according to the present invention is characterized as a mobile management system which includes a plurality of mobile nodes and a mobile management server connected to each other, and the mobile management server receives status information acquired by the mobile nodes and analyzes changes in distribution of the status information, wherein: the mobile node includes a status acquiring module which acquires the status information, and a communication module which transmits the status information to the mobile management server; the mobile management server includes an input/output unit which receives the status information from the mobile nodes, a management data creating unit which executes processing for analyzing the changes in the distribution of the status information and calculating a part with a particularly high distribution density in the distribution as a characteristic part, and a request processing unit which outputs information regarding the calculated characteristic part; and the management data creating unit includes a node data registering function which stores the status information along with identifiers of each of the mobile nodes to a storing module provided in advance, a label calculating function which calculates a label in which the status information is multiplexed, and a characteristic part extracting function which extracts characteristic parts showing high distribution density of the label in order from the part with the higher distribution density.

In order to achieve the foregoing object, the mobile management server according to the present invention is characterized as a mobile management server connected mutually to a plurality of mobile nodes including a status information acquiring module for acquiring status information, which receives the status information acquired by the mobile nodes and analyzes changes in distribution of the status information. The mobile management server includes: an input/output unit which receives the status information from the mobile nodes; a management data creating unit which executes processing for analyzing the changes in the distribution of the status information and calculating a part with a particularly high distribution density in the distribution as a characteristic part; and a request processing unit which outputs information regarding the calculated characteristic part, wherein the management data creating unit includes: a node data registering function which stores the status information along with identifiers of each of the mobile nodes to a storing module provided in advance; a label calculating function which calculates a label in which the status information is multiplexed; and a characteristic part extracting function which extracts characteristic parts showing high distribution density of the label in order from the part with the higher distribution density.

In order to achieve the foregoing object, the mobile management method according to the present invention is characterized as a mobile management method used in a mobile management system including a plurality of mobile nodes and a mobile management server connected to each other, in which the mobile management server receives status information acquired by the mobile nodes and analyzes changes in distribution of the status information, wherein: a status acquiring module of the mobile node acquires the status information; a communication module of the mobile node transmits the status information to the mobile management server; an input/output unit of the mobile management server receives the transmitted status information; a management data creating unit of the mobile management server stores, to a storing module provided in advance, the status information along with identifiers of each of the mobile nodes; the management data creating unit of the mobile management server calculates a label in which the status information is multiplexed; the management data creating unit of the mobile management server extracts a characteristic parts showing parts with a high distribution density of the label in order from the part with the higher distribution density as a characteristic part; and a request processing unit of the mobile management server outputs information regarding the extracted characteristic part.

In order to achieve the foregoing object, the mobile management program according to the present invention is characterized as a mobile management program used in a mobile management system including a plurality of mobile nodes and a mobile management server connected to each other, in which the mobile management server receives status information acquired by the mobile nodes and analyzes changes in distribution of the status information. The program causes a computer provided to the mobile management server to execute: a procedure for receiving the status information transmitted from the mobile nodes; a procedure for storing, to a storing module provided in advance, the status information along with identifiers of each of the mobile nodes; a procedure for calculating a label in which the status information is multiplexed; a procedure for extracting characteristic parts showing parts with a high distribution density of the label in order from the part with the higher distribution density; and a procedure for outputting information regarding the extracted characteristic part.

As described above, the present invention is structured to calculate the label in which the status information is multiplexed and to extract the characteristic part in order from the part with the higher distribution density. Thus, it is possible to extract the characteristic part without performing a calculation for all the nodes. This makes it possible to provide the excellent mobile management system, mobile management server, mobile management method, and mobile management program capable of reducing the calculation amount for the positional information and performing analysis of the positional information quickly and in a real-time manner.

BRIEF DESCRIPTION OF THE DRAWINGS

FIG. 5 is an explanatory chart showing the stored content of a corresponding table shown in FIG. 1;

FIGS. 6A and 6B show explanatory charts showing extraction of characteristic information from the corresponding table executed by a characteristic part extracting function shown in FIG. 1, in which FIG. 6A shows points xi contained in each of labels l1 to lL of the corresponding tables also shown in FIG. 5, and FIG. 6B shows attribute information extracted therefrom;

FIG. 15 is an explanatory chart showing the stored content of parameter information shown in FIG. 13;

FIG. 18 is an explanatory chart showing an example of characteristic information extracted by the mobile management server in the mobile management system shown in FIG. 17;

FIGS. 19A and 19B show explanatory charts regarding a model chart which visually illustrates the characteristic information shown in FIG. 18, in which FIG. 19A is a visualized chart for expressing a geodetic space by taking the longitude on the lateral axis and the latitude on the longitudinal axis to express the density degree scores as the length of the sticks on the xy coordinates of the center positions of the identifier numbers of each characteristic point on the geodetic space to express the spread as a radius of a circle, and FIG. 19B shows chronic changes in the density degree scores and the spread at a specific point of FIG. 19A;

FIGS. 22A and 22B show explanatory charts showing an example of registering an observing point in the mobile management system shown in FIG. 21, in which FIG. 22A shows the registered observing points as "X" on the graph shown in FIG. 19A, and FIG. 22B shows chronic changes in the density degree scores and the spread at the observing point.

Figure 1:
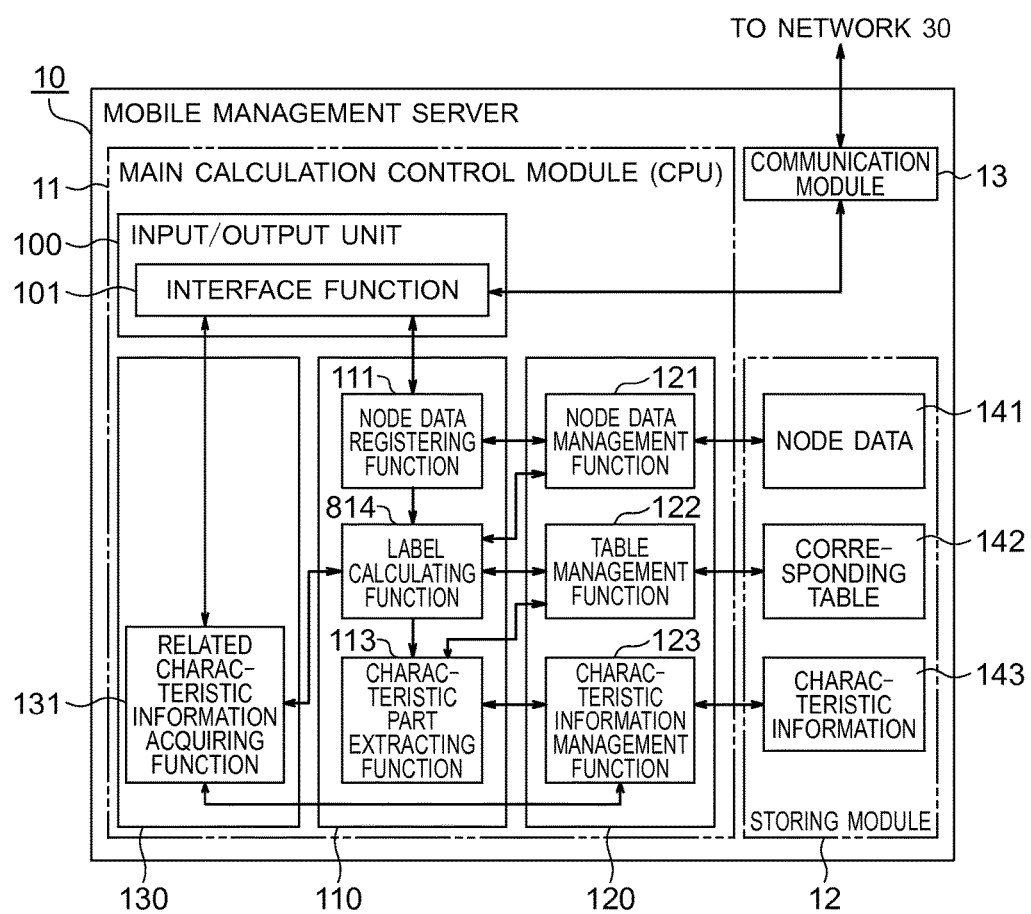
FIG. 1 is an explanatory chart showing the structure of a mobile management server shown in FIG. 2 in more details.

BEST MODES FOR CARRYING OUT THE INVENTION (First Embodiment)

The structures of the first embodiment will be described hereinafter by referring to the accompanying drawings FIGS. 1 to 3.

The basic contents of the embodiment will be described first, and more specific contents thereof will be described thereafter.

A mobile management system 1 according to the embodiment is a mobile management system in which a plurality of mobile nodes 20 and a mobile management server 10 are connected mutually, with which the mobile management server receives status information acquired by the mobile nodes and analyzes the changes in the distribution of the status information. The mobile node 20 includes: a status acquiring unit 200 which acquires the status information; and a communication unit (communication module 22) which transmits the status information to the mobile management server. Further, the mobile management server 10 includes an input/output unit 100 which receives the status information from the mobile nodes; a management data creating unit 110 which analyzes the changes in the distribution of the status information and performs calculations by taking a particularly high distribution density part in the distribution as a characteristic part; and a request processing unit 130 which outputs information regarding the calculated characteristic part. Further, the management data creating unit 110 includes: a node data registering function 111 which stores the status information to a storing module provided in advance along with identifiers of each of the mobile nodes; a label calculating function 112 which calculates a label in which the status information is multiplexed; and a characteristic part extracting function 113 which extracts the characteristic parts showing the parts with a high distribution density of the label in order from the part with the higher distribution density.

The label calculating function 112 of the mobile management server 10 calculates the label from the status information by utilizing a function (specifically LSH (Locality Sensitive Hashing) and the like) which maps the status information to discriminable values by reflecting the locality of the status distribution. Further, the characteristic part extracting function 113 stores, to the storing module 112, a characteristic information set in which the characteristic parts showing the high distribution density parts of the label are clustered.

Note here that the status information contains at least the positional information of the mobile node. Further, the request processing unit 130 of the mobile management server 10 outputs the information regarding the characteristic part to the mobile node 20, and the mobile node 20 includes a display module (input/output module 24) which displays the received information regarding the characteristic part.

With the above-described structures, the mobile management system 1 can analyze the positional information quickly and in a real-time manner by reducing the calculation volume for the positional information.

Hereinafter, this will be described in more details.

Figure 2:
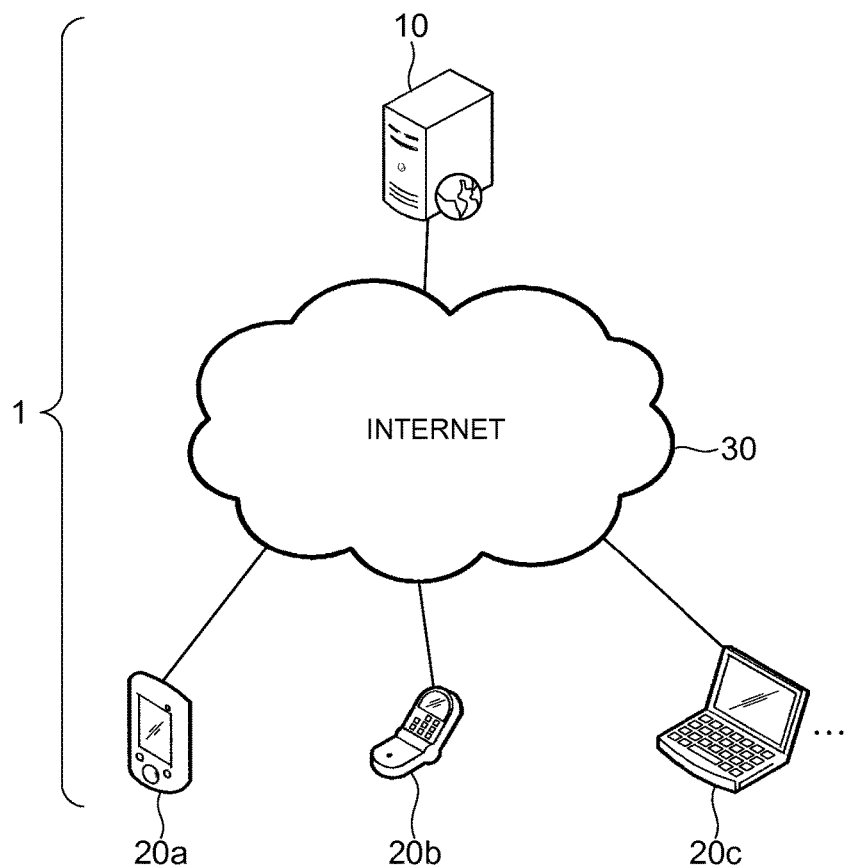
FIG. 2 is an explanatory chart showing the structure of a mobile management system according to a first embodiment of the present invention.

FIG. 2 is an explanatory chart showing the structures of the mobile management system 1 according to the first embodiment of the present invention. The mobile management system 1 is constituted by connecting a plurality of mobile nodes 20a, 20b, 20c, —to the mobile management server 10 via a network 30. The mobile nodes 20a, 20b, 20c, —are portable electric devices such as mobile phone terminals, smartphone terminals, notebook personal computers, or the like. All of those have common structures, so that those devices are referred as the mobile nodes 20 in general hereinafter. Further, the network 30 may be of a wired communication type or a wireless communication type, and the communication method thereof is not specifically limited. Hereinafter, the mobile nodes 20 may be simply referred to as "node".

FIG. 1 is an explanatory chart showing the more-detailed structures of the mobile management server 10 shown in FIG. 2. The mobile management server 10 has the structure as a general computer. The mobile management server 10 includes: a main calculation control module (CPU: Central Processing Unit) 11 which is the main unit for executing various kinds of processing written as computer programs; the storing module 12 for storing the data and programs; and the communication module 13 which performs data communications with other computers by being connected to the network 30.

Through operating a mobile management program, the main calculation control module 11 operates as the input/output unit 100, the management data creating unit 110, the data management unit 120, and the request processing unit 130 to be described later. Further, node data 141 which stores the information regarding each of the mobile nodes 20, a corresponding table 142, and characteristic information 143 are stored, respectively, in the storing module 12.

The input/output unit 100 includes an interface function 101. The management data creating unit 110 includes the node data registering function 111, the label calculating function 112, and the characteristic part extracting function 113. The data management unit 120 includes a node data management function 121, a table management function 122, and a characteristic information management function 123. Further, the request processing unit 130 includes a related characteristic information acquiring function 131.

The input/output unit 100 performs data communication with the mobile nodes 20 by being connected to the network 30 via the communication module 13. Among those, the interface function 101 controls the communication module 13 to provide a means for transmitting the data (upload) to the mobile management server 10 from the mobile nodes 20 and for transmitting the data (download) in the reverse direction.

The management data creating unit 110 updates current status data of the mobile node 20, table data to be described later, characteristic data, and the like when adding, deleting the mobile node 20 or updating the status of the mobile node 20. Particularly, the node data registering function 111 refers to the node data management function 121 and keeps the node data to be in the latest status at all times for addition of a new mobile node 20 and deletion of the existing mobile node 20.

The label calculating function 112 calculates the corresponding label from the current status of the inputted node data and requests the table management function 122 to update the label and the current status information of the mobile node 20. The characteristic part extracting function 113 extracts a characteristic part from the table management function 122 and requests to update the characteristic information management function 123 to keep the characteristic information of the system as the latest.

The data management unit 120 manages the data generated by each function of the management data creating unit 110. Among those, the node data management function 121 manages the node data 141 that is the status information of the registered mobile node 20 that exists in the mobile management system 1. The table management function 122 manages the label corresponding to the registered node and the corresponding table 142 of the mobile node 20. The feature management information 123 manages the characteristic information 143 extracted from the table by the characteristic part extracting function 113.

The request processing unit 130 returns information in response to a request from the outside such as from the mobile node 20 or an administrator. Among those, the related characteristic information acquiring function 131 acquires and excerpts the characteristic information highly related to the request by referring to the characteristic information management function 123 for a characteristic information acquiring request via the interface function 101, and returns it to the one who made the request.

Figure 3:
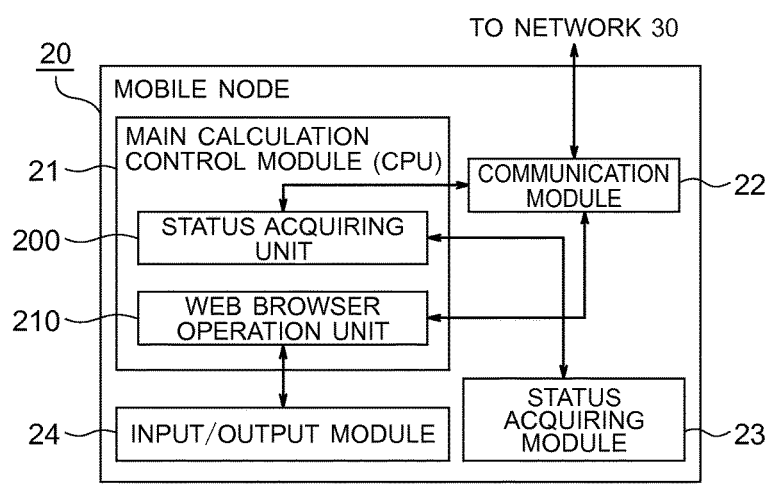
FIG. 3 is an explanatory chart showing the structure of a mobile node shown in FIG. 2 in more details.

FIG. 3 is an explanatory chart showing the structure of the mobile node 20 shown in FIG. 2 in more details. The mobile node 20 also has the structure as a basic computer. That is, the mobile node 20 includes: a main calculation control module 21 and a communication module 22 same as those of the mobile management server 10; a status acquiring module 23 which acquires a status amount; and an input/output module 24 which receives an operation input from the user, and presents the operation result to the user.

The main calculation control module 21 operates as a status acquiring unit 200 and a web browser operation unit 210 by operations of the mobile management program. The status acquiring unit 200 acquires the own status via the status acquiring module 23, and transmits it to the mobile management server 10. The status herein means the current position of the mobile node 20 acquired by communication with GPS (Global Positioning System), a ground station, or the like, attributes such as age, gender, occupation, or the like of each user inputted in advance, etc.

The web browser operation unit 210 requests the request processing unit 130 of the mobile management server 10 to send information based on the operation input from the user via the input/output module 24 by operating the web browser for viewing the websites, and presents the obtained information to the user via the input/output module 24.

Note here that each of the mobile nodes 20 has an identifier that is defined uniquely within the mobile management system 1. Further, the current position as the status of the mobile node 20 is expressed by a set of vectors. Typically, it is expressed with a pair of coordinate values of a three-dimensional Euclidean space which expresses the place. However, the current position is not limited to be expressed only with those. Any information in which the distance between the nodes is defined may be used as well.

Hereinafter, the status (position) of the node (mobile node 20) i is defined as xi. The node data management function 121 keeps a set Φ shown in Expression 1 in the followings as the node data 141 provided that the node number is N.

$$\Phi = \{(i, x_i) \in N \times R^3 | i=1, 2, \ldots, N\} \quad \text{(Expression 1)}$$

Figure 4:
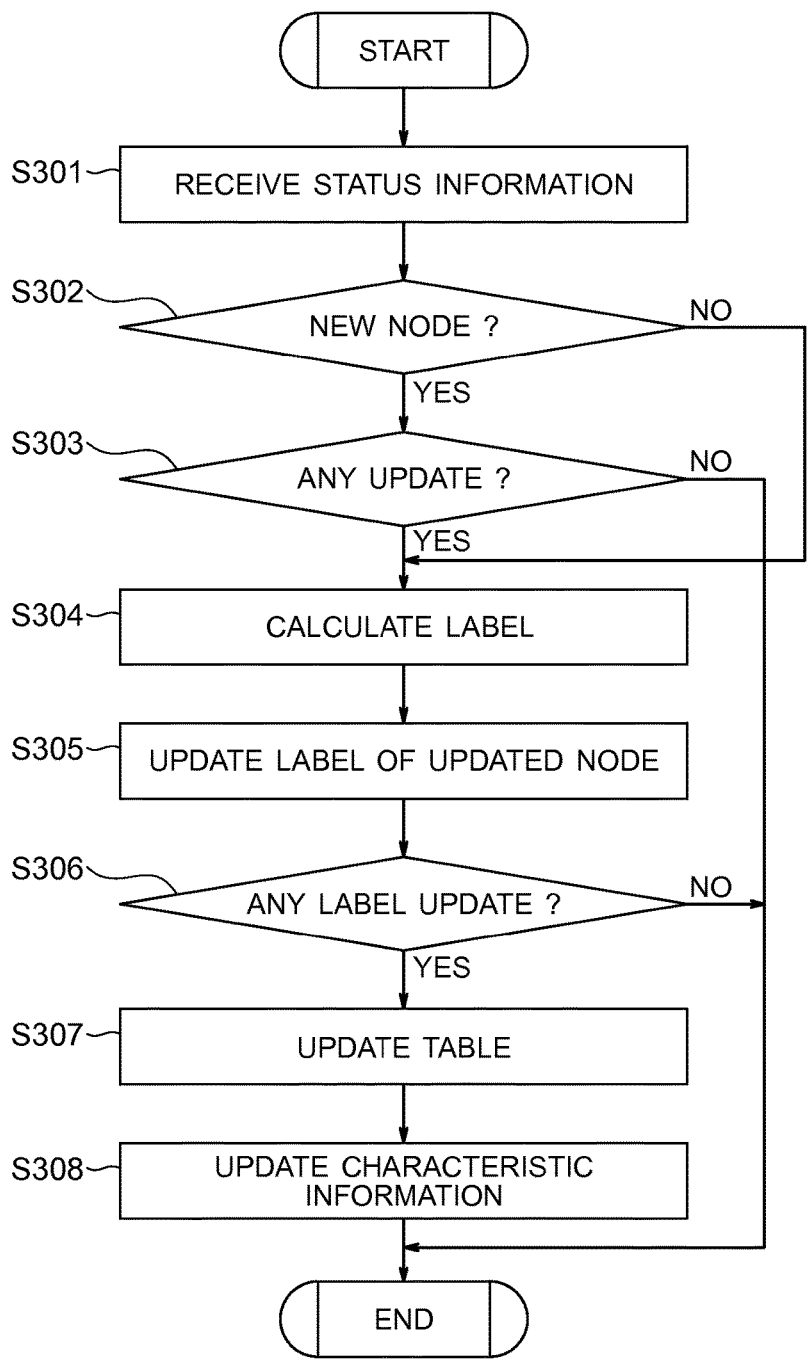
FIG. 4 is a flowchart showing operations for updating status information of the mobile node executed in the mobile management system 1 shown in FIGS. 1 to 3.

FIG. 4 is a flowchart showing operations for updating the status information of the mobile node 20 executed in the mobile management system 1 shown in FIGS. 1 to 3. In each of the mobile nodes 20, the status acquiring unit 200 acquires the positional information every time the position changes due to the shift and the like, and transmits a status update request (place update request) to the node data registering function 111 (step S301).

It is described herein that the information update request is issued from the mobile node 20. Inversely, however, it is also possible to make an inquiry about the position regularly from the mobile management server 10 side to the mobile node 20 already registered as the node data 141. It is also possible with this to check whether each of the mobile nodes 20 is active or in active.

The node data registering function 111 upon receiving the positional information checks whether or not the mobile node 20 that is the transmitter side of the positional information is a new node by comparing it with the node data 141 via the node data management function 121 (step S302). When judged as new (Yes in step S302), it is added anew to the node data 141, and the procedure is advanced to step S304 to be described later. When judged as already being registered (No in step S302), the position of the registered mobile node 20 and the received new position are compared to check whether or not there is update (step S303). When there is no update, the processing is ended there (No in step S303).

When judged that there is update (Yes in step S303), the label is calculated from the position x inputted from the mobile node 20 (step S304), and the label of the updated node is updated (step S305). In this explanation, a function f(x) shown in Expression 2 and Expression 3 expressed with a well-known method LSH (Locality Sensitive Hashing) is used as a method for calculating the label.

Other than that, it is also possible to use any functions which reflect the locality of the status distribution (relation of distance between arbitrary two points) and map it to discriminable values such as integers. When selecting the function, it is preferable to use a function which depends on the definition of the statuses and the distance between the statuses, and has same values as the defined distances become closer.

$$f(x): R^D \to z \quad \text{(Expression 2)}$$

$$f(x) = \left[\frac{a \cdot x + r}{W}\right] \bmod C \quad \text{(Expression 3)}$$

LSH is a function designed in such a manner that the probability for input values x and y of given two points to have same values is a decreasing function of the distance d(x, y) between the statuses. In general, while the form of LSH changes depending on the statuses or the definition of the distance between the statuses, the characteristic thereof is saved. Thus, it satisfies the object of the present invention. Further, in a case where it is necessary to express two or more spaces of different distance scales (positional information and taste information, for example) as one status collectively, it is possible to use a well-known method, e.g., expressing the distance by using Mahalanobis distance, for example.

In Expression 3, an actual number W and a positive number C of 2 or higher are setting parameters, r is a random number according to a uniform distribution of [0, W], a is a D-dimensional vector in which each component is a random number according to a normal distribution N(0, 1), and a calculation takes the maximum integer not exceeding an actual number z.

In Expression 3, x of f(x) is referred to as an atomic label, and x of h(x) shown in Expression 4 acquired by multiplexing it for B bits is referred to as a label of x.

$$h(x) = \langle f_1(x), f_2(x), \ldots, f_B(x) \rangle f_i(x) (=1, 2, \ldots, B) \quad \text{(Expression 4)}$$

is independently acquired by selecting random number with Expression 3

The label calculating function 112 informs a new label to the node data management function 121 for a label h(xi) for the status xi of the node (mobile node 20) i calculated in this manner, and checks whether or not the label h(xi) for the status xi is updated (step S306). When there is no update, the processing is ended there (No in step S306).

When there is update (Yes in step S306), the node data management function 121 updates the label of the node i, and informs the table management function 122 that the label of the node i is updated (step S307).

FIG. 5 is an explanatory chart showing the stored content of the corresponding table 142 shown in FIG. 1. The corresponding table 142 managed by the table management function 122 saves a node status set βj having a same label value lj shown in Expression 5.

$$\beta_j = \{x_i | h(x_i) = l_j\} \quad \text{(Expression 5)}$$

While the set βj is defined as a set of the node statuses herein for simplification, other detailed information of each node may be contained as well. For example, pointers for the detailed information of the node data 141 saved in the node data management function 121 may be used. The point is that it needs to be able to put the nodes having same label values defined by the node statuses into a group.

Further, there may be a plurality of corresponding tables 142. In that case, it is assumed that the label calculating function which calculates the labels of each table independently sets all the random numbers in the label calculating function defined by Expression 3. When there is update of the label, the table management function 122 performs update processing by erasing xi from the old entry (set) where the status of the node i is included and inserting the status xi to the entry (set) for the new label in step S307 in response to an update request.

Returning to FIG. 4, when the update processing of the table is completed, the characteristic part extracting function 113 updates the characteristic information 143 with the characteristic information extracted from the corresponding table 142 held by the table management function 122 (step S308), and ends the processing. The characteristic information is created from the corresponding table 142.

Note here that extraction of the characteristics executed by the characteristic part extracting function 113 is to identify the part with a high density among the set $X=\{xi\}$ of the statuses xi of all the mobile nodes 20 of the mobile management system 1. In such part, the set of data having the same label are distributed in a close distance from each other. Thus, assuming that the number of elements of a set P is expressed as |P|, a group of data selectively sampled from the periphery of the high density part in order from the higher ones can be acquired by rearranging the table in a descending order of $|\beta_j|$. Thus, it is possible to identify the characteristic (high density) place. No distance calculation is required for the characteristic extraction, and it is simply required to perform calculations shown in Expression 3 for the number of data. Therefore, quickness is secured.

In order to simplify the explanations, a case of having only a single corresponding table 142 is considered as the simplest example. Note here that the subscription j of the labels can be rearranged in order from those of larger $|\beta_j|$ without losing the generality. With that, $\beta_j$ of given integer values of 2 or larger within the range of $j=1, \ldots, q$ is defined as $Q=\{\beta_j\}(j=1, \ldots, q)$. A set Y of the node statuses xi belonging to Q is expressed with Expression 6 shown below.

$$Y=\{x_i|x_i \in \beta_1 \cup \ldots \cup \beta_q\} \quad \text{(Expression 6)}$$

This Y is a set of the node statuses selectively sampled only from the high density parts. Each of the clustered high density parts contained in Y is referred to as a characteristic information set. This Y can reduce the number of elements compared to the original entire node statuses X, and the dense areas are sufficiently distant from each other. Thus, clustering can be performed extremely easily and precisely. For clustering, a hierarchical clustering method, typically a Word method, may be used. Alternatively, k-mean method or the like may also be used provided that the number of dense areas is known in advance.

Further, as a method for speeding up the clustering, there is a method which utilizes the fact that $\beta_j \in Q$ intensively distributes in the periphery of an already existing center point. When $e_j$ is defined as the average of the node statuses belonging to $\beta_j$ and it is expressed as $e_j=\text{ave}(\beta_j)$, a set T of pairs of specific distance $d_{th}$ or less expressed in Expression 7 can be acquired at the distance $d_{ij}$ between all $e_i$ and $e_j$ where $i<j$.

$$e_j = ave(\beta_j)$$

$$d_{ij} = |e_i - e_j|$$

$$T=\{(i,j)|d_{ij}<d_{th}\} \quad \text{(Expression 7)}$$

When a graph constituted with nodes j at position $e_j$ is considered and an undirectional link is formed between the nodes of all the pairs of $(i, j) \in T$, a graph $G=(V, L)$ shown in Expression 8 is formed.

$$G=(V,L)$$

$$V=\{i|i=1,2,\ldots,q\}$$

$$L=\{(i,j)|(i,j) \in T\} \quad \text{(Expression 8)}$$

The graph G shown in Expression 8 is broken down to a set of connected graphs (a graph having a path between arbitrary two elements) Gi shown in Expression 9. Note here that S is the total number of consolidated graphs. Assuming that S is an empty set, the condition of Expression 10 is satisfied for arbitrary i and j (i and j are natural numbers satisfying $\leq S$ and $i \neq j$).

$$G_i = (V_i, L_i) \quad \text{(Expression 9)}$$
$$V = \bigcup\nolimits_{i=1 \ldots S} V_i$$
$$L = \bigcup\nolimits_{i=1 \ldots S} L_i$$

$$V_i \cap V_j = \phi \text{ and } L_i \cap L_j = \phi \quad \text{(Expression 10)}$$

A set $\gamma k$ shown in Expression 11 by using Vk is considered.

$$\gamma_k = \{x_i | x_i \in \cup_{j \in V_k} \beta_j\} \quad \text{(Expression 11)}$$

$\gamma k$ shown in Expression 11 is a set in which the sets $\beta j$ of the node statuses whose average positions thereof are at close distance from each other (equal to or less than a specific distance) are combined, and it is considered as a characteristic information set to be acquired. Note, however, that the equation regarding $\gamma k$ shown in Expression 11 means that xi is contained in a union of $\beta j$ for all of j belonging to Vk.

In general, in a case where there are a plurality of corresponding tables 142 (u-pieces, u is an integer of 2 or larger), it is also possible to extract the dense areas through forming Qu by selecting samples for q from each of the tables u in order from those with a larger number of elements and performing same clustering on Q that is a union of all of Qu. Further, the precision is improved as the number of the tables is increased, and the dens point is easily found as the q becomes larger. However, for that, longer time is required. Thus, the parameter may be set as appropriate by taking the detection precision and the processing time into consideration.

FIGS. 6A and 6B are explanatory charts showing extraction of the characteristic information 143 from the corresponding table 142 executed by the characteristic part extracting function 113 shown in FIG. 1. FIG. 6A shows points xi contained in each of the labels 11 to 1L of the corresponding tables 142 also shown in FIG. 5, and FIG. 6B shows the attribute information extracted therefrom.

L is the total number of the labels, and K is the upper limit number of the characteristic information extracted from the labels. As shown in FIG. 6B, the characteristic information 143 is saved as the attribute information regarding extracted K-pieces of labels. For example, the characteristic information 143 is extracted under a policy such as "extract K pieces of characteristic amounts of higher order of specific attribute information from L-pieces of labels". M is the number of pieces of attribute information extracted from those labels. Aij shows "characteristic amount of j-th attribute information of extracted i-th label" ($1 \leq i \leq K$, $1 \leq j \leq M$).

As the attribute information herein, it is possible to define "center point coordinate ave($\gamma k$)" as "information 1", for example, "element number $|\gamma k|$" as "information 2", "spread of distribution" as "information 3", and the like. Regarding $\gamma k$ shown in Expression 9, the center point coordinate ave($\gamma k$) is the place of the characteristic point. The element number $|\gamma k|$ shows the extent of the density at the place ave($\gamma k$) in the original node status set X. The spread of distribution is the average value of the distance to all the elements from ave(γk). The characteristic part extracting function 113 extracts the characteristic information, and transmits it to the characteristic information management function 123. The information is stored as the characteristic information 143.

Figure 7:
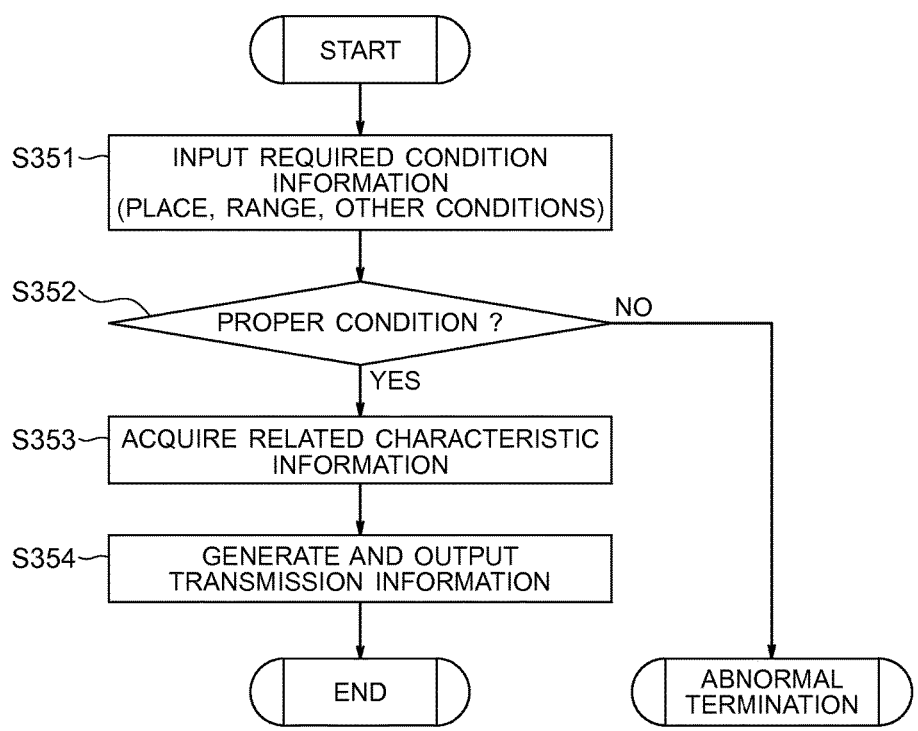
FIG. 7 is a flowchart showing operations for acquiring characteristic information executed by the mobile management system shown in FIGS. 1 to 3.

FIG. 7 is a flowchart showing operations when acquiring the characteristic information 143 executed in the mobile management system 1 shown in FIGS. 1 to 3. The user designates and inputs, to the mobile management server 10, the condition of the characteristic information desired to acquire from the mobile node 20, another computer connected to the network 30, or the input/output unit 100 of the mobile management server 10 itself (step S351). As the conditions to be designated, there are "place and range", "time range", "upper limit number and sorting policy", and the like, and those depend on the attribute of the characteristic information. For example, it is possible to designate the condition such as "output upper limit of 20-pieces of the characteristic information of up to 10 hours ago within a radius of 1 km of my current position in order from those with a larger number of elements".

The related characteristic information acquiring function 131 acquires the condition inputted in step S351 via the interface function 101, interprets the inputted condition, and judges whether or not it is a proper condition (step S352). When the condition inputted in S501 is improper (No in step S352), an error message is outputted and processing is terminated abnormally.

When the condition is correct (Yes in step S352), the related characteristic information acquiring function 131 acquires the information corresponding to the condition from the characteristic information 143 via the characteristic information management function 123 (step S353), converts it to a data format (e.g., xml format or the like) required for returning to the requester and outputs it (step S354).

(Overall Operations of First Exemplary Embodiment)

Next, the overall operations of the exemplary embodiment will be described. The mobile management method according to the exemplary embodiment is used in the mobile management system 1 in which: a plurality of mobile nodes 20 and the mobile management server 10 are connected mutually; and the mobile management server receives the status information acquired by the mobile nodes, and analyzes changes in the distribution of the status information. With the method, the mobile node status acquiring module acquires the status information, the communication module of the mobile node transmits the status information to the mobile management server, and the input/output unit of the mobile management server receives the transmitted status information (FIG. 4, step S301). The management data creating unit of the mobile management server stores the status information along with the identifiers of each of the mobile nodes to the storing module provided in advance, and the management data creating unit of the mobile management server calculates the label in which the status information is multiplexed (FIG. 4, steps S304 to 307). The management data creating unit of the mobile management server extracts the characteristic parts showing the parts with high distribution density of the label in order from the part with higher distribution density (FIG. 4, step S308). The request processing unit of the mobile management server outputs the information regarding the extracted characteristic part (FIG. 7, steps S353 to 354).

Note here that each of the above-described steps may be put into programs to be executed by a computer, and each of the steps may be executed by the mobile management server 10 which is the computer for directly executing each of the steps. The program may be recorded on a non-transitory recording medium such as a DVD, a CD, a flash memory, or the like. In that case, the program is read out from the recording medium and executed by the computer.

Through this operation, the exemplary embodiment can provide following effects.

The exemplary embodiment is structured to be able to extract the characteristic information of the distribution of the statuses, typically the positions of the mobile nodes, and the information of a particularly dense part without calculating the distances for all the nodes. That is, "distance calculation for all the nodes", which requires the calculation amount on the order of square of the total number N of the mobile nodes as described above, becomes unnecessary. Thus, even with the mobile management system where the total number N of the mobile nodes becomes particularly large, it is possible to suppress the calculation amount greatly and to perform the characteristic information extraction processing quickly and in a real-time manner.

Further, since the exemplary embodiment uses a stochastic method, it is not necessary to grasp the spread of the high density points in a strict manner. Thus, it is possible to extract the characteristic information with high precision even when calculations of the parameters such as W, C in Expression 3 and B and the like in Expression 4 are not executed with high precision. That is, it is possible to suppress the calculation amount also from this perspective.

(Second Exemplary Embodiment)

In addition to the structure of the first embodiment described above, in a second exemplary embodiment of the present invention, a mobile management server 410 includes a fixed point observing unit 450 which outputs information regarding the distribution density of the status information at a specific observing point designated from a mobile node.

With this structure, it is possible to acquire the characteristic information regarding the specific observing point quickly and in a real-time manner in addition to achieving the effect of the first exemplary embodiment described above.

Hereinafter, this will be described in more details.

Figure 8:
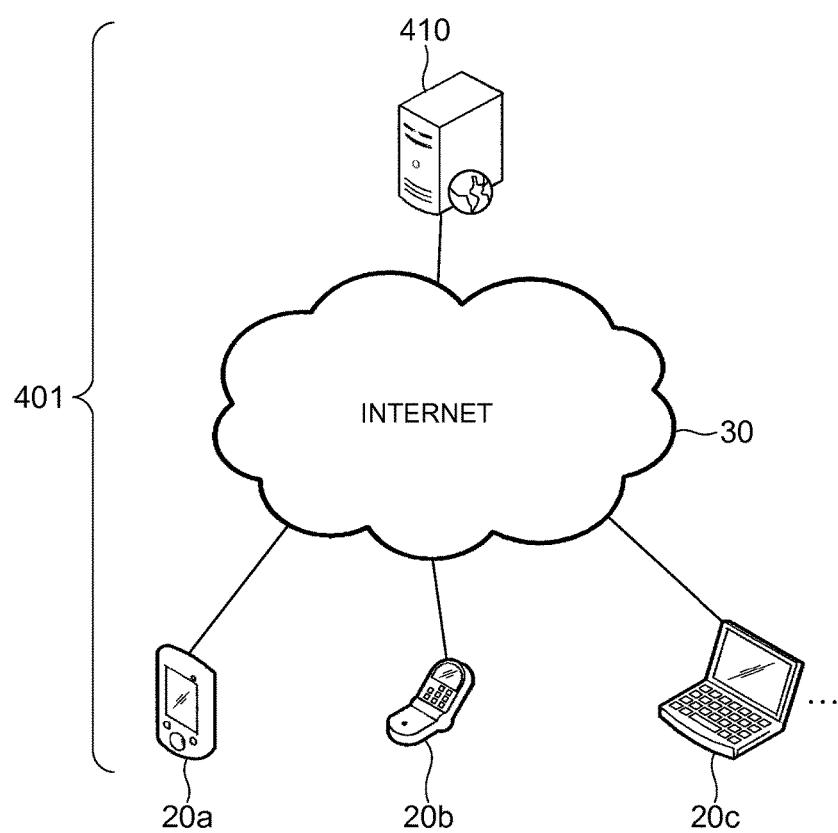
FIG. 8 is an explanatory chart showing the structure of a mobile management system according to a second embodiment of the present invention.

FIG. 8 is an explanatory chart showing the structure of the mobile management system 401 according to the second exemplary embodiment of the present invention. The mobile management system 401 is constituted by connecting a plurality of mobile nodes 20 same as those of the first exemplary embodiment to the mobile management server 410 via a network 30 that is also same as that of the first exemplary embodiment.

Figure 9:
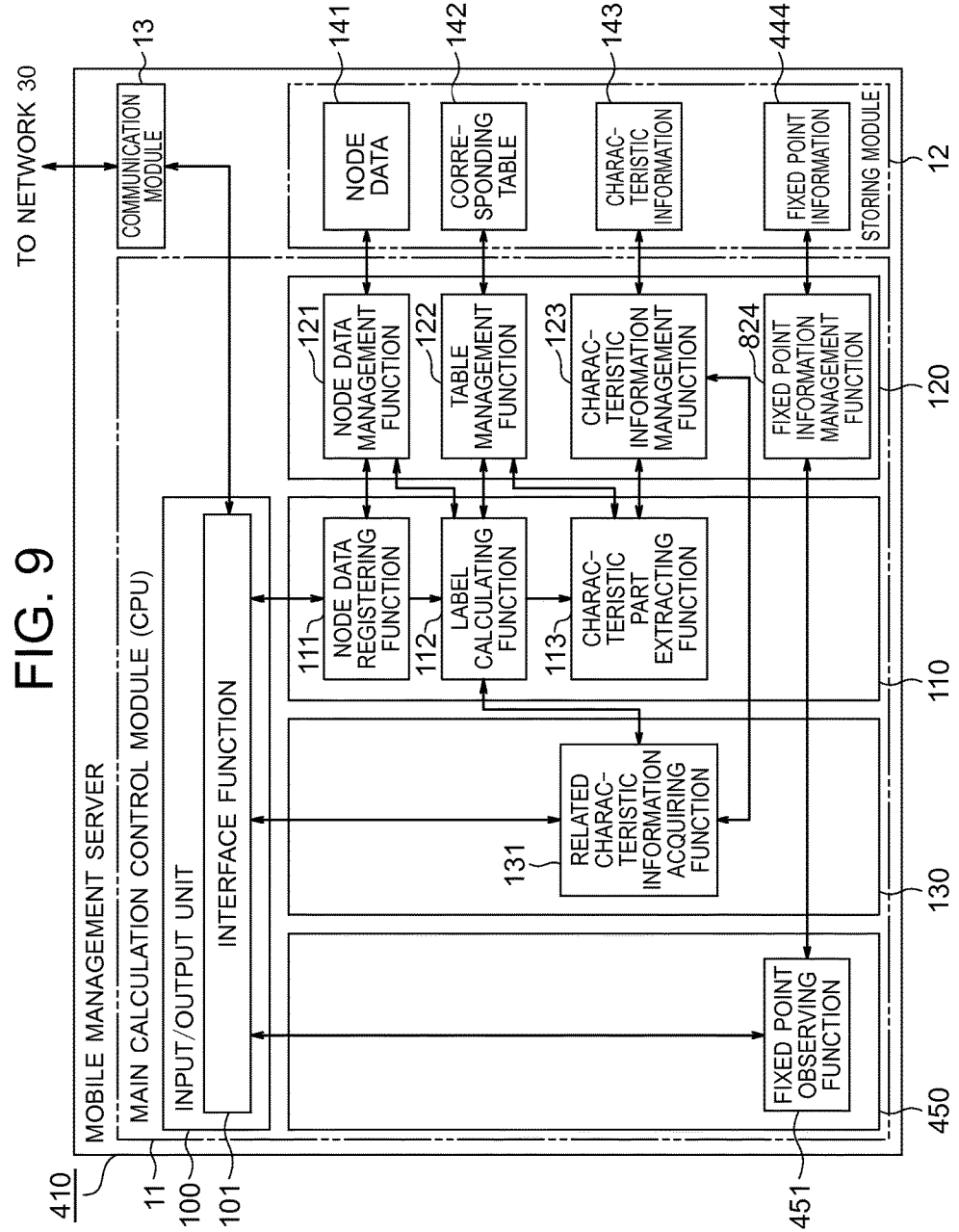
FIG. 9 is an explanatory chart showing the structure of a mobile management server shown in FIG. 8 in more details.

FIG. 9 is an explanatory chart showing the structure of the mobile management server 410 shown in FIG. 8 in a more detailed manner. The mobile management server 410 has the structure as that of the mobile management server 10 described in the first exemplary embodiment as the hardware. That is, the mobile management server 410 includes a main calculation control module 11, a storing module 12, and a communication module 13 as in the case of the mobile management server 10 described in the first exemplary embodiment.

However, in the mobile management server 410, the mobile management program operated by the main calculation control module 11 is partially different from that of the mobile management server 10 of the first exemplary embodiment. Thus, the data management unit 120 is replaced with another data management unit 420, and a fixed point observing unit 450 is provided additionally. The data management unit 420 includes a fixed point information management function 424 anew in addition to the node data management function 121, the table management function 122 and the characteristic information management function 123 described in the first exemplary embodiment. Further, the fixed point observing unit 450 includes a fixed point observing function 451.

Further, fixed point information 444 is stored in the storing module 12 anew in addition to the node data 141, the corresponding table 142, and the characteristic information 143 described in the first exemplary embodiment. Other operation units and the data are referred under same names and reference numerals as those of the first exemplary embodiment.

The fixed point observing unit 450 includes a fixed point observing function 451 which observes the information regarding the distribution of the node statuses highly related to the measuring points defined in advance of the mobile node 20 and the administrator. The fixed point observing function 451 receives a set of the measuring points from outside such as the mobile node 20, the administrator, and the like, and updates and registers it to the fixed point information 444 by the fixed point information managing function 424. Further, update processing such as adding and deleting of the measuring point is executed simultaneously. Further, the information to be measured in advance regarding the measuring point is measured and updated at a determined time interval or upon receiving a command input, and it is transmitted to the external requester.

The fixed point information management function 424 holds the measuring point information registered by the fixed point measuring function 451, refers to the corresponding table 142 via the table management function 122 regularly by using a timer or at update timing upon receiving a manual input, and creates and updates the characteristic information regarding the measuring point.

Figure 10:
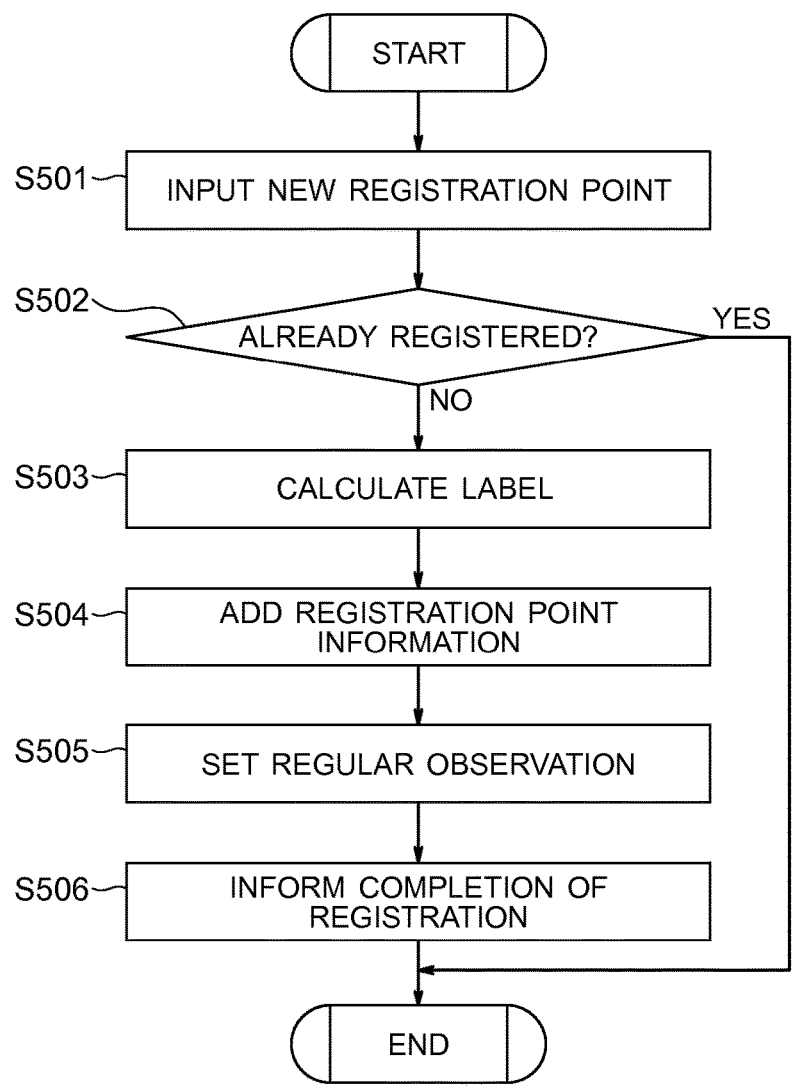
FIG. 10 is a flowchart showing operations of registration/update processing of the observing point executed by the mobile management system shown in FIGS. 8 to 9.

FIG. 10 is a flowchart showing operations of measuring point registration/update processing executed by the mobile management system 401 shown in FIGS. 8 to 9.

Each of the mobile nodes 20 transmits the place desired to observe the characteristic as the observing point to the mobile management server 410 (step S501). For example, in a case where it is desired to measure the dense degree of the nodes at a given place, the coordinate value ξi is inputted as the observing point. In the mobile management server 410 that has received the positional information, the fixed point observing function 451 refers to the fixed point information 444 to check whether or not the observing point ξi is already registered (step S502). When it is already registered (Yes in step S502), the processing is ended there.

When the observing point ξi is not registered (No in step S502), the label calculating function 112 calculates the corresponding label li from the coordinate value ξi of a new observing point in the same manner as in step S305 described above (step S503). The fixed point observing function 451 applies a unique ID (defined as i) thereto as the new observing point (i, ξi, li), and adds the observing point to the fixed point information 444 via the fixed point information management function 424 (step S504).

Subsequently, the fixed point observing function 451 sets the measurement policy such as the observing interval of the timer or a manual input for the registered new observing point, for example (step S505). Then, completion of the new observing point registration is informed to the user, and the processing is ended (step S506).

Figure 11:
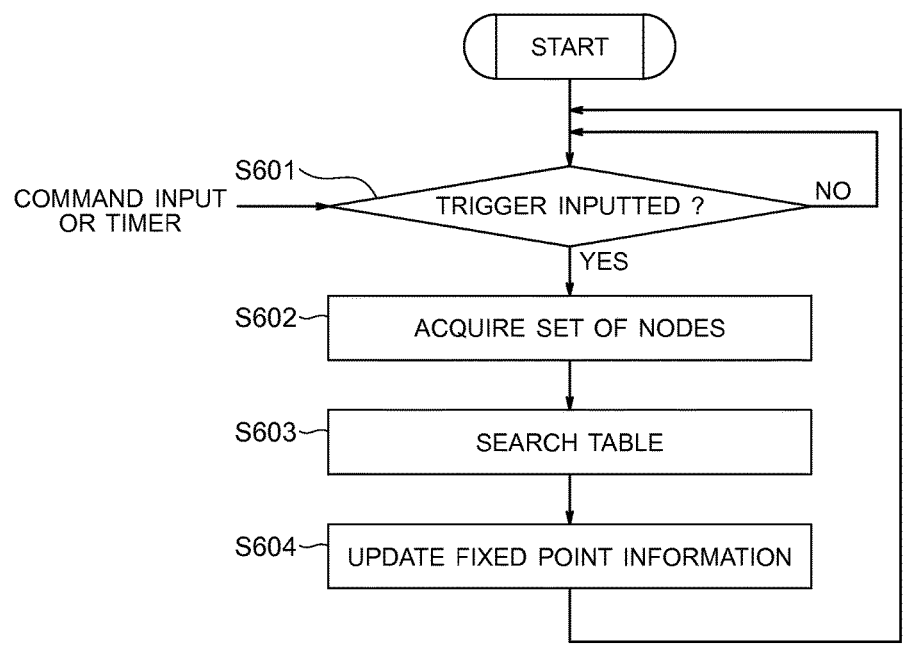
FIG. 11 is a flowchart showing operations of fixed point observation processing executed by the mobile management system shown in FIGS. 8 to 9.

FIG. 11 is a flowchart showing operations of the fixed point observation processing executed by the mobile management system 401 shown in FIGS. 8 to 9. The fixed point observing function 451 is normally in a standby state for starting an operation. When a command is inputted via the interface function 101 or a regular trigger according to the timer is inputted (step S601), the fixed point observing function 451 refers to the corresponding table 142 via the table management function 122 for all the observing points ξi registered in the fixed point information 444, and acquires the node set βi as the entries of the labels li of the observing points ξi (step S602).

The nodes belonging to βi are the nodes close in distance with respect to the observing points ξi, so that it is considered to reflect the density information of the observing points ξi. Thus, regarding βi, the characteristic information management function 123 searches those containing βi among the characteristic information set γk contained in the corresponding table 142 (step S603), and updates the characteristic information 143 via the characteristic information management function 123 by taking the characteristic information extracted from γk as the characteristic information of the observing point i (step S604).

When q mentioned above is small, there is a possibility that βi is not necessarily contained in the characteristic information set saved by the characteristic information management function 123. In such case, "no characteristic" may be returned considering that there is no characteristic in the observing point, only base information set as default may be returned, or average characteristic of the entire table entries may be returned, for example.

Further, when it is interested only in the relative relations between the registered observing points, it is also possible to simply acquire a union of the node sets βi as the entries of the labels li of the observing points ξi for all the tables, take it as the characteristic information set γi for each of the observing points, and extract the characteristic information in the manner same as the method described above.

According to the exemplary embodiment described above, it is possible to acquire the characteristic information regarding a specific observing point quickly and in a real-time manner without executing "distance calculations for all the nodes". Thus, even with the mobile management system where the total number N of the mobile nodes becomes particularly large, it is possible to suppress the calculation amount greatly and to perform the characteristic information extraction processing quickly and in a real-time manner for specific observing points.

(Third Exemplary Embodiment)

In addition to the structure of the first exemplary embodiment described above, a third exemplary embodiment of the present invention is so structured that a mobile management server 710 includes a label calculation parameter management function 814 which calculates parameters required for calculating a label instead of the label calculating function. Further, a mobile node 720 includes a label calculation module (label calculating unit 920) which receives the parameters from the mobile management server and calculates the label.

With this structure, it is possible to acquire the same effects as those of the first exemplary embodiment described above without transmitting the status information such as the detailed positional information to the mobile management server from the mobile node.

Hereinafter, this will be described in more details.

Figure 12:
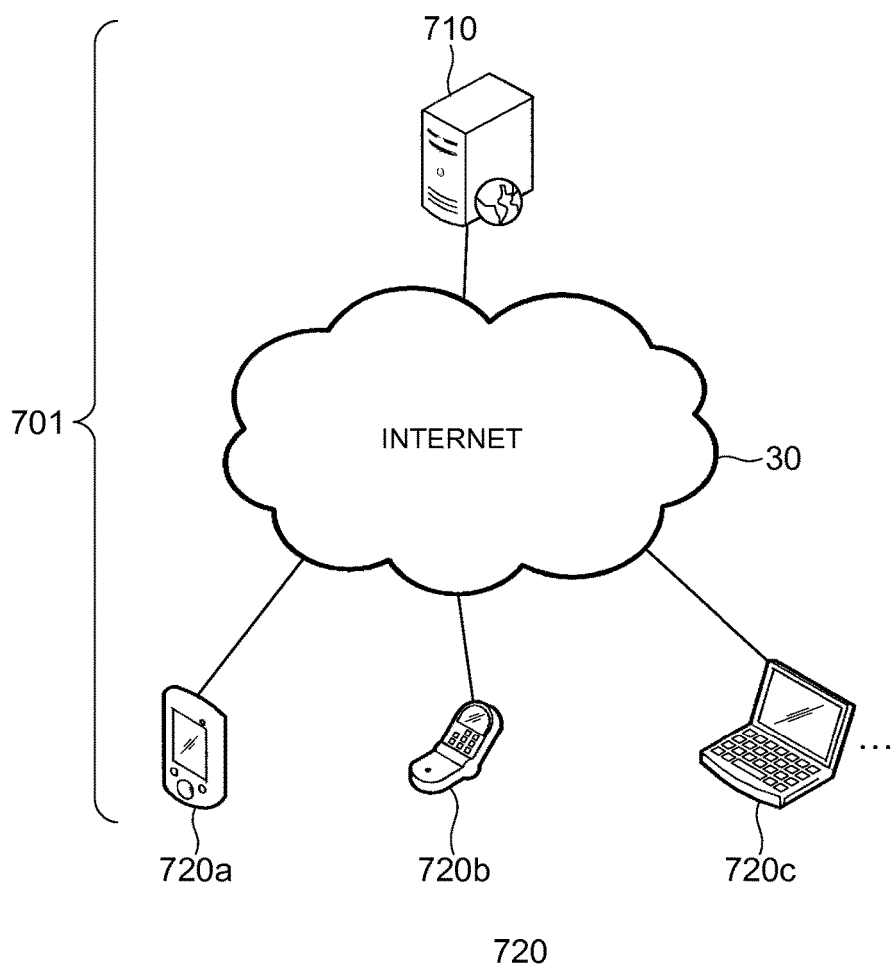
FIG. 12 is an explanatory chart showing the structure of a mobile management system according to a third embodiment of the present invention.

FIG. 12 is an explanatory chart showing the structure of the mobile management system 701 according to the third exemplary embodiment of the present invention. The mobile management system 701 is constituted by connecting the mobile management server 710 different from that of the first exemplary embodiment and a plurality of mobile nodes 720a, 720b, 720c, —to the network 30 same as that of the first exemplary embodiment. All of the mobile nodes 720a, 720b, 720c, —have the common structure, so that those are referred to as the mobile nodes 720 in general hereinafter.

Figure 13:
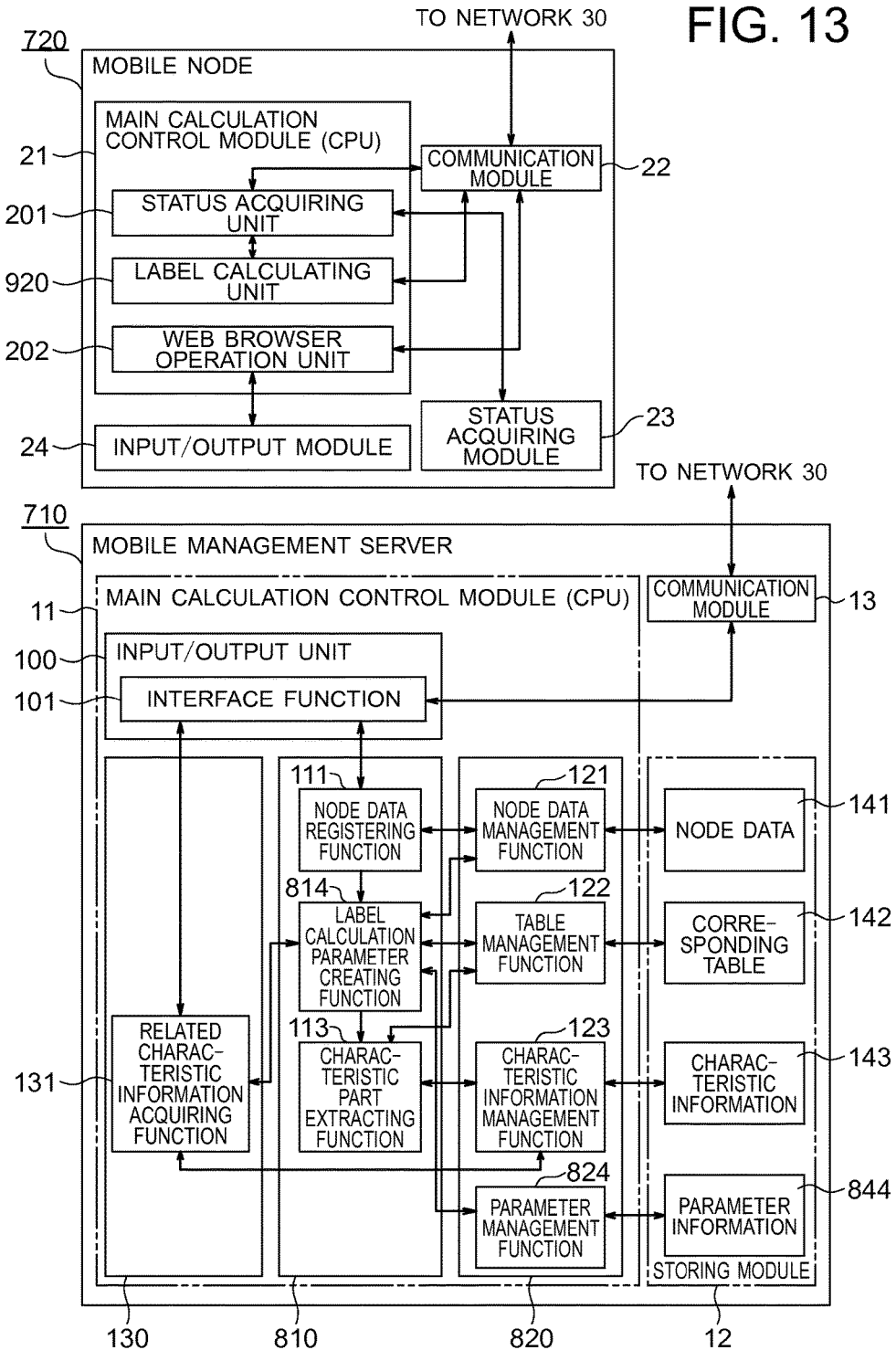
FIG. 13 is an explanatory chart showing the structures of a mobile management server and a mobile node described in FIG. 12 in more details.

FIG. 13 is an explanatory chart showing the structures of the mobile management server 710 and the mobile node 720 described in FIG. 12 in more details. The label calculation function 112 of the management data creating unit 110 provided on the mobile management server 10 side in the first exemplary embodiment described above is structured to be executed by the mobile node 720 in this exemplary embodiment.

That is, the mobile node 720 is the same as the mobile node 20 described in the first exemplary embodiment in terms of hardware. However, in addition to the status acquiring unit 200 and the web browser operation unit 210 as the functional units operated by a main calculation control module 21, a label calculating unit 920 is added to each of the mobile nodes 720.

Calculations executed by the label calculating unit 920 are same as the calculations described in the label calculation function 112 (Expressions 3 to 4) of the management data creating unit according to the first exemplary embodiment. Further, the label h(xi) corresponding to the status xi of the node itself calculated by the calculations shown in Expressions 3 to 4 is transmitted to the mobile management server 710.

In the meantime, while the mobile management server 710 is the same as the mobile management server 10 described in the first exemplary embodiment in terms of hardware, the management data creating unit and the data management unit operated by the main calculation control module 11 are replaced with another management data creating unit 810 and another data management unit 820, respectively. Further, parameter information 844 is stored anew to the storing module 12.

In the management data creating unit 810, the label calculation function 112 of the mobile management server 10 is replaced with another label calculation parameter creating function 814, and the node data registering function is replaced with another node data registering function 811. Further, a parameter management function 824 is added to the data management unit 820, and the parameter information 844 is stored to the storing module 12.

The label calculation parameter creating function 814 generates the parameters (a, r, W, C, B of Expression 3 to 4) required for calculating the label by the calculations shown in Expression 3 to 4 by the label calculating unit 920 of each of the mobile nodes 720, and transmits it to the respective mobile nodes 720. The parameter management function 824 updates the stored content of the parameter information 844 according to that.

Figure 14:
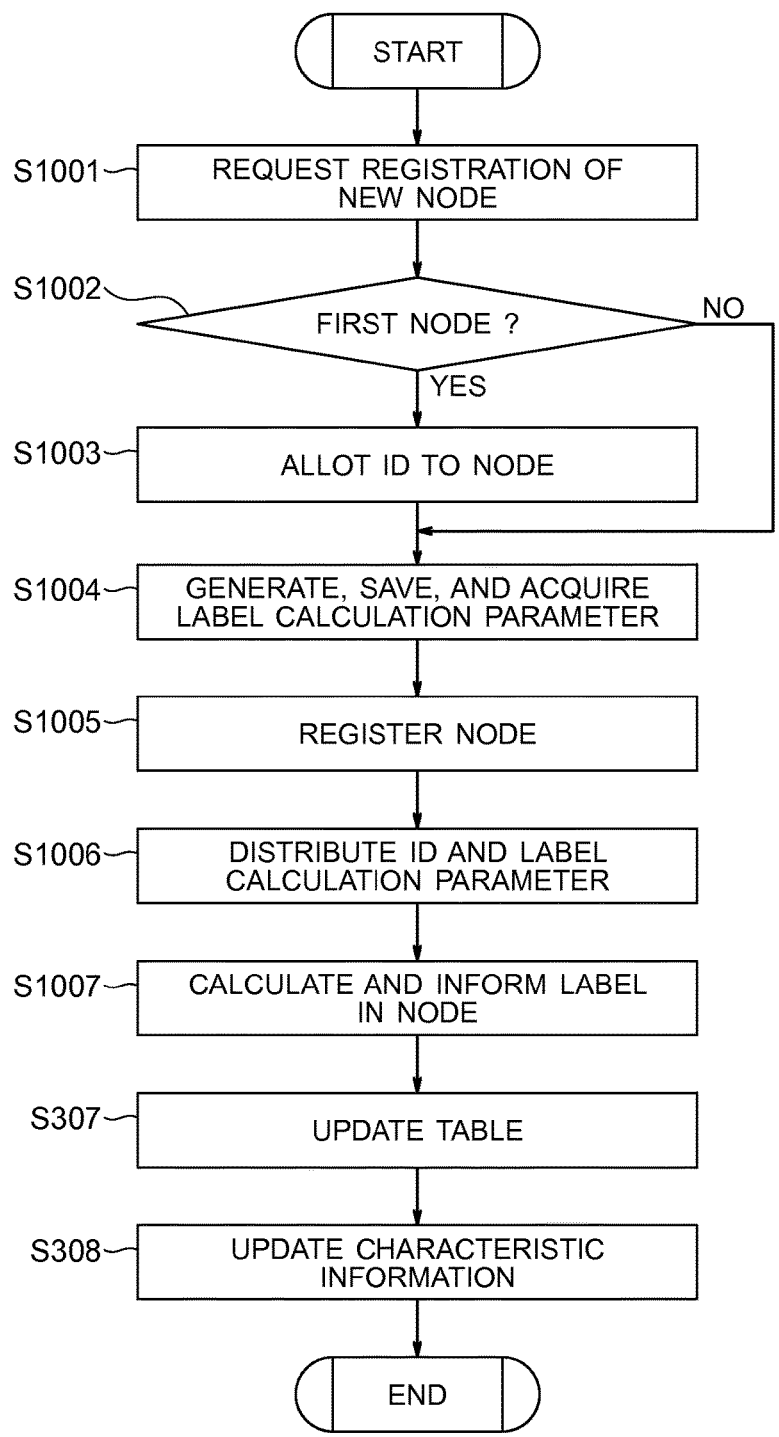
FIG. 14 is a flowchart showing operations for registering a new node executed by the mobile management server shown in FIG. 12.

FIG. 14 is a flowchart showing a new node registering operation executed by the mobile management system 701 shown in FIG. 12. When a new mobile node 720 participates in the mobile management system 701, the mobile node 720 first transmits a participation request to the mobile management server 710 via the web browser operation unit 210 (step S1001).

The mobile management server 710 upon receiving the participation request judges whether or not the number of the mobile node 720 currently registered in the mobile management system 701 is 0, i.e., whether or not the mobile node 720 that has transmitted the participation request is the first node of the mobile management system 701 (step S1002). When it is the first node (Yes in step S1002), the node data management function 121 is referred to and a unique ID is allotted to the node (step S1003). A sequence number, for example, may be applied or other regulations such as an IP address may be allotted instead, as long as the node can be uniquely identified within the system.

When it is not the first node (No in step S1002), the ID of the node is already registered to the node data 141. Thus, the operation is advanced to step S1004 by omitting processing of step S1003. Further, the operation is also advanced to step S1004 after an ID is allotted to the first node in the processing of step S1003.

Further, the label calculation parameter creating function 814 automatically creates the parameters (a, r, W, C, B of Expression 3 to 4) required for calculating the label for the mobile node 720 that has transmitted the participation request (step S1004).

FIG. 15 is an explanatory chart showing the stored content of the parameter information 844 shown in FIG. 13. Among the parameters generated in step S1004, a and r are determined by creating random numbers when executing this processing. In the meantime, W, C, and B are the parameters given in advance by the administrator and stored in advance to the parameter information 844. When there is an already registered node, the label calculation parameters generated already in the past are acquired from the parameter information 844.

Returning to FIG. 14, the node data registering function 811 registers the node to the node data 141 via the node data management function 121 (step S1005), and transmits the ID issued in step S1003 and the parameters generated in step S1004 to the mobile node 720 that has issued the request (step S1006).

The mobile node 720 upon receiving it compares the ID stored by itself with the transmitted ID if necessary, calculates the label by executing the calculations shown in Expression 3 to 4 by the label calculating unit 920 by utilizing the transmitted parameters and the status acquired by the status acquiring unit 200, and returns the calculated label to the mobile management server 710 (step S1007). The mobile management server 710 updates the label of the node registered to the corresponding table 142 with the received label in the same manner as that of step S307 shown in FIG. 4. Then, the characteristic information 143 is updated via the characteristic information management function 123 by using the characteristic part extracting function 113 in the same manner as that of step S308 shown in FIG. 4, and the processing is ended.

Figure 16:
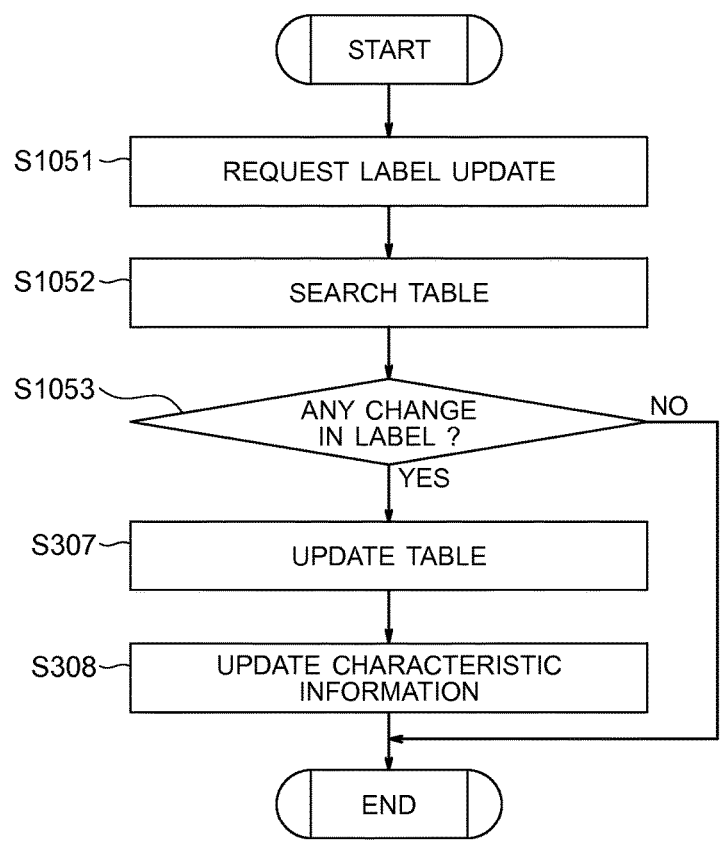
FIG. 16 is a flowchart showing operations for updating the node status executed by the mobile management system shown in FIG. 12.

FIG. 16 is a flowchart showing a node status update operation executed by the mobile management system 701 shown in FIG. 12. This operation is executed in a case where the status is changed such as a case where the mobile node 720 moves. The trigger for this operation may be when the mobile node 720 itself makes a label update request by transmitting the label calculated by the label calculating unit 920 and the ID or may be when the mobile node 720 makes a label update request in the same manner upon receiving a regular inquiry from the mobile management server 710 (step S1051).

The mobile management server 710 upon receiving the label update request searches the value of the label corresponding to the transmitted ID of the mobile node 720 from the node data 141 and the corresponding table 142 via the node data management function 121 and the table management function 122 (step S1052). Then, it is judged whether or not the received value of the label is updated compared to the stored value of the label (step S1053). When it is not updated (No in step S1053), the processing is ended there.

When the value of the label is updated (Yes in step S1053), the label of the node registered to the corresponding table 142 is updated with the received label in the same manner as that of step S307 shown in FIG. 4. Then, the characteristic information 143 is updated via the characteristic information management function 123 by using the characteristic part extracting function 113 in the same manner as that of step S308 shown in FIG. 4, and the processing is ended.

With the exemplary embodiment described above, it is possible to acquire the same effects as those of the first exemplary embodiment described above without transmitting the status information such as the detailed positional information to the mobile management server from the mobile node. Thus, each mobile node can acquire the same effects as those of the first exemplary embodiment while securing the privacy of each user.

(First Applied Example of Exemplary Embodiments)

A more specific applied example of the first to third exemplary embodiments presented above will be described.

Figure 17:
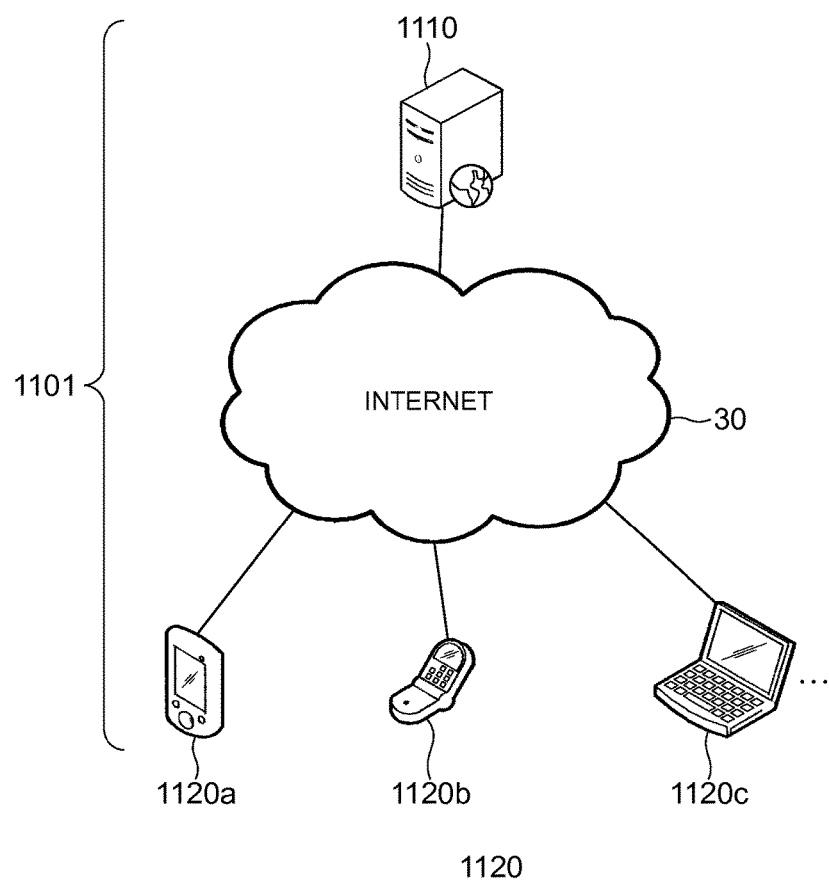
FIG. 17 is an explanatory chart showing the structure of a mobile management system according to a first applied example of the embodiment.

FIG. 17 is an explanatory chart showing the structure of a mobile management system 1101 according to a first applied example of the exemplary embodiments. In the mobile management system 1101, a mobile management server 1110 and a plurality of mobile nodes 1120a, b, c, —are connected to a network 30 same as that of the first exemplary embodiment.

The mobile nodes 1120a, b, c, —are portable electric devices such as mobile phone terminals, smartphone terminals, or notebook personal computers. All of those have common structures, so that those devices are referred in general as the mobile nodes 1120 hereinafter. The mobile node 1120 has the same structure as that of the mobile node 20 of the first exemplary embodiment shown in FIG. 3, which acquires the current position acquired by communication with GPS, a ground station, or the like as the status, and regularly informs it to the mobile management server 1110.

The mobile management server 1110 has the structure same as that of the mobile management server 10 of the first exemplary embodiment shown in FIG. 2 and, every time it receives the positional information from the mobile node 1120, updates the node data 141 and the corresponding table 142 by the operations described as the first exemplary embodiment in response to that.

Then, the mobile management server 1110 extracts the distribution of the geographical layout of the mobile nodes 1120 every time there is update, and extracts the region where the mobile nodes 1120 are located in a highly dense manner in the distribution as characteristic information 1143. FIG. 18 is an explanatory chart showing an example of the characteristic information 1143 extracted by the mobile management server 1110 in the mobile management system 1101 shown in FIG. 17. The characteristic information 1143 contains identifier numbers 1143a of each characteristic point, dens degree scores 1143a, center positions 1143c, and spread 1143d corresponding thereto. The characteristic information 1143 is acquired by extracting the points of particularly high density for a prescribed number in order from the higher one. It is unnecessary to perform the extraction processing for all the characteristic points.

FIGS. 19A and 19B are explanatory charts showing a model view 1301 which visually illustrates the characteristic information 1143 shown in FIG. 18. FIG. 19A expresses the geodetic space, in which the lateral axis is the longitude and the longitudinal axis is the latitude. It is a visualized chart which shows the dense degree score 1143b as the length of stick on xy coordinate of the center position 1143c for the identifier number 1143a of each characteristic point on the geodetic space, and shows the spread 1143d as a radius of a circle. FIG. 19B shows the chronic changes in the dense degree score 1143b and the spread 1143d at a specific point of FIG. 19A.

Here, one of the mobile nodes 1120 requests information regarding the population in the periphery of a specific position via the web browser operation unit 210. The position as the request target can be inputted by an operation such as clicking, dragging, or flicking the position and the range via GUI (Graphic User Interface) that displays the graph shown in FIG. 19A. In that case, the web browser operation unit 210 displays the graph of FIG. 19A by taking the current position as the center and, when there is an operation of "acquire information", transmits the center position and the range designated by the user to the mobile management server 1110. Alternatively, it is also possible to directly input the latitude and the longitude as the input of the designated range.

The management server 1110 upon receiving the input of the request searches those contained in the requested range from the characteristic information 1143, and returns the information regarding the characteristic point corresponding to the search result to the mobile node 1120. The web browser operation unit 210 of the mobile node 1120 displays the information received from the management server 1110 as a density plot which reflects the spread upon the center positions of each of the acquired characteristic points in a superimposed manner on the map of FIG. 19A displayed by GUI.

Figure 20:
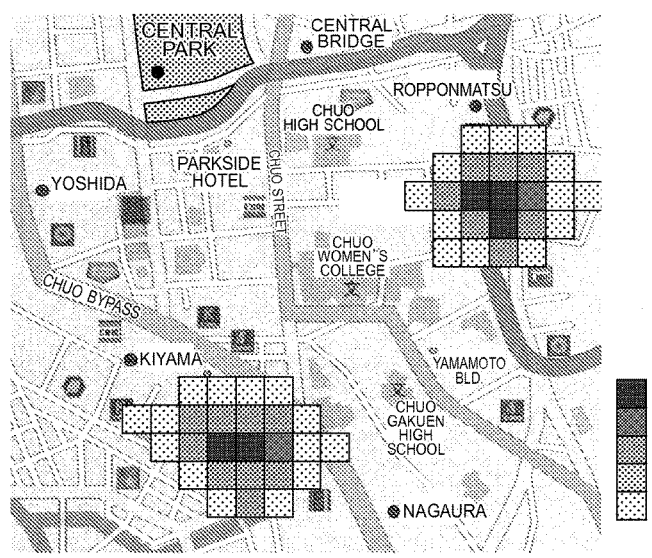
FIG. 20 is an explanatory chart showing the states displayed as a map acquired by superimposing the information from a management server on the graph shown in FIG. 19A.

FIG. 20 is an explanatory chart showing the display state in which the information from the management server 1110 is superimposed as a map on the graph shown in FIG. 19A. It is assumed herein that the range shown with a broken line on FIG. 19A is transmitted to the management server 1110 as a designated range to request the information regarding the characteristic point. The web browser operation unit 210 displays the characteristic points received from the management server 1110 in the range of the map by superimposing colors corresponding to the density. In the case shown in FIG. 20, the density display is shown with shading, and thicker shading is applied for higher density.

Thereby, the mobile node 1120 can acquire the information regarding the distribution of the population at a desired place anytime in a real-time manner. Further, it is possible to visually acquire and view the shift and the like of the distribution of the population by updating the information regularly. Through acquiring such information in a real-time manner, it is possible to use the information for various purposes such as for "avoiding congestion", for "selecting street with a lot of pedestrian traffic as much as possible for the purpose of security", etc.

Further, with the mobile management system 1101, the mobile node 1120 can be replaced with an onboard terminal of a car navigation system of an automobile. In that case, it is possible to display traffic jam information with an excellent real-time property.

In handling the normal spatial statistics, it takes an extremely large amount of time to process the vast amount of data transmitted from a great number of mobile nodes 1120. Thus, it is difficult to provide the information in a real-time manner. The mobile management system 1101 performs the processing only on the high-density part in a highly required population distribution in particular. Therefore, it is possible to provide the information in a real-time manner.

Further, the status information herein can be replaced with information other than the positions. For example, the node 1120 acquires taste information acquired from the attributes of each user of the mobile node 1120, e.g., history of acquired files from the Internet, history of the viewed websites, history of visited places in the past, or the like, as the status, and transmits it to the management server 1110.

The management server 1110 extracts the characteristic of each user from the acquired status information as a context, and expresses it with an amount in which the distance is defined such as a vector. This makes it possible to perform the same processing as the case of the positional information.

For example, in a case where "history of acquired files" is processed as the status, it is possible to extract the point where there are many people having the similar tastes in the taste distribution, i.e., the highly popular point, in a real-time manner. That is, in that case, it is possible to extract "how many people are interested in a specific file" or the tendency regarding the chronic transition of the interest in a real-time manner.

(Second Applied Example of Exemplary Embodiments)

Figure 21:
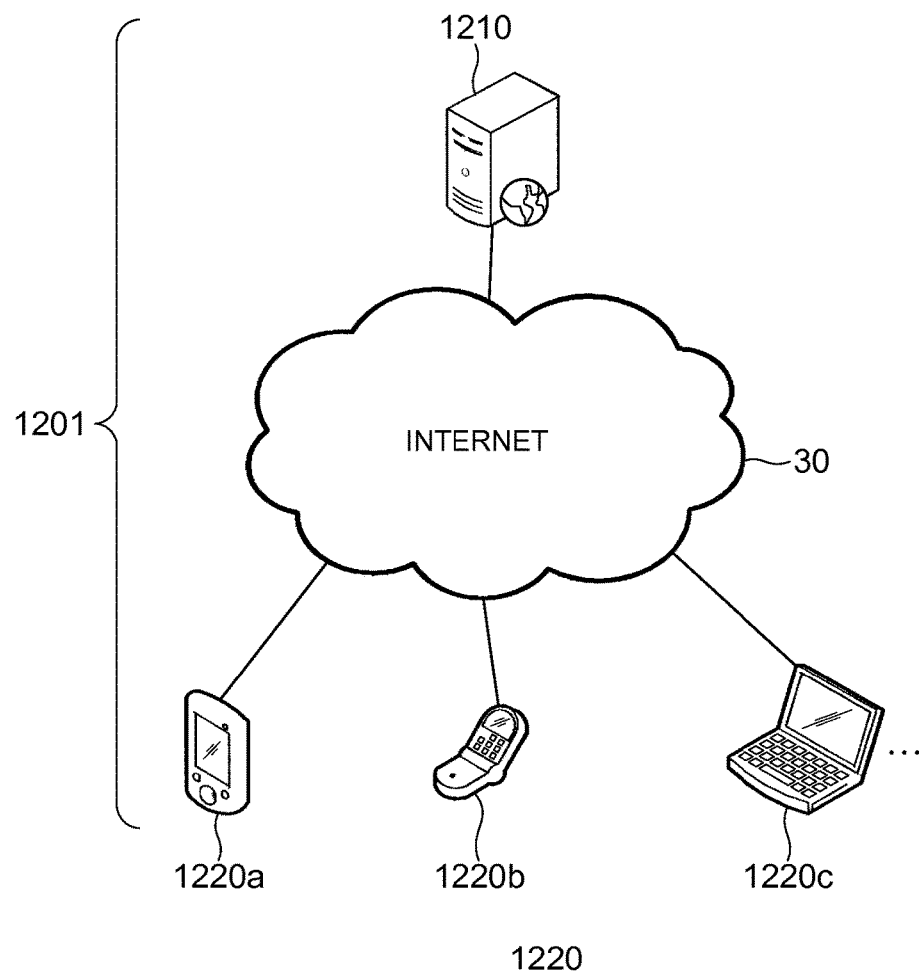
FIG. 21 is an explanatory chart showing the structure of a mobile management system according to a second applied example of the embodiments.

FIG. 21 is an explanatory chart showing the structure of a mobile management system 1201 according to a second applied example of the exemplary embodiments. In the mobile management system 1201, the function of "fixed point observation" described as the second exemplary embodiment is added further to the mobile management system 1101 according to the first applied example described in FIGS. 17 to 19. Mobile nodes 1220 and a management server 1210 are replacement of the mobile nodes 1120 and the management server 1110 according to the first applied example.

As described as the second exemplary embodiment, the fixed point observation herein means to measure the chronic changes and the like of the density of the mobile nodes 1220 at a specific measuring point (referred to as observing point hereinafter) and to display it dynamically. FIG. 22 shows explanatory charts of an example where the observing points are registered in the mobile management system 1201 shown in FIG. 21. FIG. 22A shows the registered observing points as "X" on the graph shown in FIG. 19A. FIG. 22B shows chronic changes in the density degree score 1143b of one point (the point surrounded by a broken-line circle) out of the observing points and the spread 1143d.

The management server 210 calculates the label corresponding to the registered observing point, observes the set of the mobile nodes having that label at each time, and returns the processing result to the mobile node 1220. The mobile node 1220 displays it on the map shown in FIG. 22A as in the case of the first applied example.

That is, the mobile management system 1201 is capable of displaying the changes in the density score and the spread as shown in FIG. 22B regarding the requested observing point while updating those dynamically in response to a request from the user of the mobile node 1220 and the administrator of the management server 1210.

Through observing the changes at the observing points in the manner described above, it is possible to observe the shift in the highly dense parts which determine the characteristic of the distribution of the mobile nodes. For example, the chronic changes in the population density and the density of automobiles (state of traffic jam) are the important data when determining the urban planning and the like. According to the second applied example of the exemplary embodiments, such information can be acquired more quickly and at a lower cost compared to those of the conventional spatial statistic method and the like.

(First Expansion of Applied Examples of Exemplary Embodiments)

Further, as an expansion of the first and second applied examples described above, it is considered to use the information that is a combination of the current positions of the mobile nodes and the above-described taste information of the users of each of the mobile nodes as the status, and process it with the above-described management server to execute the processing regarding the users having a specific taste.

For example, when the mobile nodes of the users having the same taste are close to each other, informing it to the users makes it possible to provide a function which supports the users to interact with each other in a social networking service using positional information. At that time, by storing in advance whether or not it is alright to display the node itself, whether or not it is alright to display files, and the like to each mobile node as the policy, it is possible to provide a service which supports interactions such as informing the users having the similar tastes as "candidates for becoming friends", displaying the files that can be opened, and the like.

Further, through taking the spatial density of the users having a specific taste as the characteristic part of the mobile node distribution and analyzing the shift of the characteristic point in a real-time manner, it can be used for selecting the contents with a device that can dynamically change the contents to be displayed, e.g., digital signage. In that case, the function of "fixed point observation" described as the second exemplary embodiment and the second applied example is utilized.

That is, it is possible to use the function of "fixed point observation" for the attributes of each user such as "having interest in a specific field", "age", "gender", and the like, and changes items of advertisement displayed according to a larger number of attributes of the users existing in the periphery of that place, for example. The mobile management system according to the exemplary embodiments or the applied examples of the present invention is particularly suited for such usages since the system is capable of performing such processing in a real-time manner.

(Second Expansion of Applied Examples of Exemplary Embodiments)

The mobile management system according to the exemplary embodiments or the applied examples of the present invention can be utilized for providing a various positional information application services created based on the population density dynamic shift information and the like. Further, the mobile management system may be put into API (Application Programming Interface) to be used for providing a system with which third parties can freely create a positional information service application using the mobile node distribution information.

While the present invention has been described above by referring to the specific embodiments shown in the drawings, the present invention is not limited only to the embodiments described above. Any other known structures can be employed, as long as the effects of the present invention can be achieved therewith.

Regarding each of the embodiments described above, the new technical contents of the above-described embodiments can be summarized as follows. While a part of or a whole part of the embodiments can be summarized as follows as the new techniques, the present invention is not necessarily limited only to the followings.

(Supplementary Note 1)

A mobile management system including a plurality of mobile nodes and a mobile management server connected to each other, in which the mobile management server receives status information acquired by the mobile nodes and analyzes changes in distribution of the status information, wherein:

the mobile node includes a status acquiring module which acquires the status information, and a communication module which transmits the status information to the mobile management server;

the mobile management server includes an input/output unit which receives the status information from the mobile nodes, a management data creating unit which executes processing for analyzing the changes in the distribution of the status information and calculating a part with a particularly high distribution density in the distribution as a characteristic part, and a request processing unit which outputs information regarding the calculated characteristic part; and the management data creating unit includes a node data registering function which stores the status information along with identifiers of each of the mobile nodes to a storing module provided in advance, a label calculating function which calculates a label in which the status information is multiplexed, and a characteristic part extracting function which extracts characteristic parts showing high distribution density of the label in order from the part with the higher distribution density.

(Supplementary Note 2)

The mobile management system as depicted in Supplementary Note 1, wherein the label calculating function of the mobile management server calculates the label from the status information by utilizing a function which maps the status information to discriminable values by reflecting locality of status distribution.

(Supplementary Note 3)

The mobile management system as depicted in Supplementary Note 1, wherein the characteristic part extracting function of the mobile management server stores, to the storing module, a characteristic information set in which the characteristic parts showing the parts with high distribution density of the label are clustered.

(Supplementary Note 4)

The mobile management system as depicted in Supplementary Note 3, wherein the mobile management server includes a fixed point observing unit which outputs information regarding distribution density of the status information at a specific observing point designated from the mobile node.

(Supplementary Note 5)

The mobile management system as depicted in Supplementary Note 1, wherein:

the mobile management server includes, instead of the label calculating function, a label calculation parameter management function which calculates a parameter required for calculating the label; and the mobile node includes a label calculating module which calculates the label by receiving the parameter from the mobile management server.

(Supplementary Note 6)

The mobile management system as depicted in any one of Supplementary Notes 1 to 5, wherein the status information includes at least positional information of the mobile node.

(Supplementary Note 7)

The mobile management system as depicted in any one of Supplementary Notes 1 to 6, wherein:

the request processing unit of the mobile management server outputs information regarding the characteristic part to the mobile node; and the mobile node includes a display module which displays the received information regarding the characteristic part.

(Supplementary Note 8)

A mobile management server connected mutually to a plurality of mobile nodes including a status information acquiring module for acquiring status information, which receives the status information acquired by the mobile nodes and analyzes changes in distribution of the status information, and the mobile management server includes:

an input/output unit which receives the status information from the mobile nodes;

a management data creating unit which executes processing for analyzing the changes in the distribution of the status information and calculating a part with a particularly high distribution density in the distribution as a characteristic part; and a request processing unit which outputs information regarding the calculated characteristic part, wherein the management data creating unit includes:

a node data registering function which stores the status information along with identifiers of each of the mobile nodes to a storing module provided in advance;

a label calculating function which calculates a label in which the status information is multiplexed; and a characteristic part extracting function which extracts characteristic parts showing high distribution density of the label in order from the part with the higher distribution density.

(Supplementary Note 9)

A mobile management method used in a mobile management system including a plurality of mobile nodes and a mobile management server connected to each other, in which the mobile management server receives status information acquired by the mobile nodes and analyzes changes in distribution of the status information, wherein:

a status acquiring module of the mobile node acquires the status information;

a communication module of the mobile node transmits the status information to the mobile management server;

an input/output unit of the mobile management server receives the transmitted status information;

a management data creating unit of the mobile management server stores, to a storing module provided in advance, the status information along with identifiers of each of the mobile nodes;

the management data creating unit of the mobile management server calculates a label in which the status information is multiplexed;

the management data creating unit of the mobile management server extracts a characteristic parts showing parts with a high distribution density of the label in order from the part with the higher distribution density; and a request processing unit of the mobile management server outputs information regarding the extracted characteristic part.

(Supplementary Note 10)

A mobile management program used in a mobile management system including a plurality of mobile nodes and a mobile management server connected to each other, in which the mobile management server receives status information acquired by the mobile nodes and analyzes changes in distribution of the status information, and the program causes a computer provided to the mobile management server to execute:

a procedure for receiving the status information transmitted from the mobile nodes;

a procedure for storing, to a storing module provided in advance, the status information along with identifiers of each of the mobile nodes;

a procedure for calculating a label in which the status information is multiplexed;

a procedure for extracting characteristic parts showing parts with a high distribution density of the label in order from the part with the higher distribution density; and a procedure for outputting information regarding the extracted characteristic part.

This Application claims the Priority right based on Japanese Patent Application No. 2011-062136 filed on Mar. 22, 2011 and the disclosure thereof is hereby incorporated by reference in its entirety.

INDUSTRIAL APPLICABILITY

It is possible to be applied broadly to the mobile management systems. Such mobile management system is not only effective for urban planning and the like but also can be utilized as various services, marketing researches, and the like using positional information.

REFERENCE NUMERALS 1, 401, 701, 1101, 1201 Mobile management system
10, 410, 710, 1110, 1210 Mobile management server
11, 21 Main calculation control module
12 Storing module
13, 22 Communication module
20, 720, 1120, 1220 Mobile node
23 Status acquiring module
24 Input/output module
30 Network
100 Input/output unit
101 Interface function
110, 810 Management data creating unit
111 Node data registering function
112 Label calculating function
113 Characteristic part extracting function
120, 420, 820 Data management unit
121 Node data management function
122 Table management function
123 Characteristic information management function
130 Request processing unit
131 Related characteristic information acquiring function
141 Node data
142 Corresponding table
143, 1143 Characteristic information
200 Status acquiring unit
210 Web browser operation unit
424 Fixed point information management function
444 Fixed information
450 Fixed point observing unit
451 Fixed point observing function
814 Label calculation parameter creating function
824 Parameter management function
844 Parameter information
920 Label calculating unit
1301 Model view

What is claimed is:

1. A mobile management system comprising a plurality of mobile nodes and a mobile management server connected to each other, the mobile management server receiving status information acquired by the mobile nodes and analyzing changes in distribution of the status information, wherein:

the mobile node comprises a processor and memory storing computer-executable code that the processor executes to acquire the status information and transmit the status information to the mobile management server;

the mobile management server comprises a processor and memory storing computer executable code that the processor executes to:

receive the status information from the mobile nodes;
analyze the changes in the distribution of the status information;
calculate a part with a particularly high distribution density in the distribution as a characteristic part;
output information regarding the calculated characteristic part, wherein:

as part of analysis of the changes in the distribution, a node data registering function is performed which stores the status information along with identifiers of each of the mobile nodes, a label calculating function is performed which calculates a label in which the status information is bundled, and a characteristic part extracting function is performed which extracts characteristic parts showing high distribution density of the label in order from the part with the higher distribution density;

the label calculating function calculates a label which has the same value with higher probability when the status information of the mobile nodes are closer with respect to distance relation defined among the status information of the plurality of mobile nodes;

the label in which the status information is bundled is the label bundled by putting together the labels calculated by the plurality of label calculating functions which are formed using an outcome of a random variable generated according to a probability distribution;

the characteristic part extracting function stores a characteristic information set in which the characteristic parts showing the parts with high distribution density of the status information of the mobile nodes are clustered by using the label in which the status information is bundled; and the characteristic parts extracted by the characteristic part extracting function are output, wherein the analysis of the changes in the distribution, and calculation of the part with the particularly high distribution density are performed sufficient to provide output of the information in real-time, where the output of the information is positional information regarding the mobile nodes and displayed on the mobile node, wherein the mobile node comprises a movable terminal for which there is a positional information management system, wherein the positional information management system displays the received positional information regarding the mobile nodes in real-time such that capabilities of the positional information management system are improved, and wherein the navigation system performs functionality that receiving the position information in real-time permits such that the capabilities of the positional information management system are improved.

2. The mobile management system as claimed in claim 1, wherein
the label calculating function of the mobile management server calculates the label from the status information by utilizing a function which maps the status information to discriminable values by reflecting locality of status distribution.

3. The mobile management system as claimed in claim 1, wherein
the characteristic part extracting function of the mobile management server stores a characteristic information set in which the characteristic parts showing the parts with high distribution density of the label are clustered.

4. The mobile management system as claimed in claim 3, wherein
the mobile management server outputs information regarding distribution density of the status information at a specific observing point designated from the mobile node.

5. The mobile management system as claimed in claim 1, wherein:
the mobile management server performs, instead of the label calculating function, a label calculation parameter management function which calculates a parameter required for calculating the label; and
each of the mobile nodes calculates the label by receiving the parameter from the mobile management server.

6. The mobile management system as claimed in claim 1, wherein
the status information includes at least positional information of the mobile node.

7. The mobile management system as claimed in claim 1, wherein:
information regarding the characteristic part is output to the mobile node; and
the mobile node displays the received information regarding the characteristic part.

8. A mobile management server connected mutually to a plurality of mobile nodes that each acquire status information, mobile management server comprising:
a processor; and
memory storing computer-executable code that the processor executes to:
receive the status information from the mobile nodes;
analyze the changes in the distribution of the status information;
calculate a part with a particularly high distribution density in the distribution as a characteristic part; and
output information regarding the calculated characteristic part,
wherein:
as part of analysis of the changes in the distribution, a node data registering function is performed which stores the status information along with identifiers of each of the mobile nodes;
as part of the analysis of the changes in the distribution, a label calculating function which calculates a label in which the status information is bundled;
as part of the analysis of the changes in the distribution, a characteristic part extracting function which extracts characteristic parts showing high distribution density of the label in order from the part with the higher distribution density;
the label calculating function calculates a label which has the same value with higher probability when the status information of the mobile nodes are closer with respect to distance relation defined among the status information of the plurality of mobile nodes;
the label in which the status information is bundled is the label bundled by putting together the labels calculated by the plurality of label calculating functions which are formed using an outcome of a random variable generated according to a probability distribution;
the characteristic part extracting function stores a characteristic information set in which the characteristic parts showing the parts with high distribution density of the status information of the mobile nodes are clustered by using the label in which the status information is bundled; and
the characteristic parts extracted by the characteristic part extracting function are output,
wherein the analysis of the changes in the distribution, and calculation of the part with the particularly high distribution density are performed sufficient to provide output of the outputs information in real-time, where the output of the information is positional information regarding the mobile nodes and displayed on the mobile node,
wherein the mobile node comprises a motor vehicle having a navigation system, wherein the navigation system displays the received positional information regarding the mobile nodes in real-time such that capabilities of the navigation system are improved, and wherein the navigation system performs functionality that receiving the position information in real-time permits such that the capabilities of the navigation system are improved.

9. A mobile management method used in a mobile management system comprising a plurality of mobile nodes and a mobile management server connected to each other, the method comprising:
acquiring, by the mobile nodes, the status information;
transmitting, by the mobile nodes, the status information to the mobile management server;
receiving, by the mobile management server, the transmitted status information;
storing, by the mobile management server, the status information along with identifiers of each of the mobile nodes;
calculating, by the mobile management server, a label in which the status information is bundled via a label calculating function;
extracting, by the mobile management server, a characteristic parts showing parts with a high distribution density of the label in order from the part with the higher distribution density via a characteristic part extracting function; and
outputting, by the mobile management server, information regarding the extracted characteristic part, wherein
the label calculating function calculates a label which has the same value with higher probability when the status information of the mobile nodes are closer with respect to distance relation defined among the status information of the plurality of mobile nodes;
the label in which the status information is bundled is the label bundled by putting together the labels calculated by the plurality of label calculating functions which are formed using an outcome of a random variable generated according to a probability distribution;
the characteristic part extracting function stores a characteristic information set in which the characteristic parts showing the parts with high distribution density of the status information of the mobile nodes are clustered by using the label in which the status information is bundled; and the characteristic parts extracted by the characteristic part extracting function are output, wherein analysis of the changes in the distribution, and calculation of the part with the particularly high distribution density are performed sufficient to provide output of the information in real-time, where the output of the information is positional information regarding the mobile nodes and displayed on the mobile node, wherein the mobile node comprises a movable terminal for which there is a positional information management system, wherein the positional information management system displays the received positional information regarding the mobile nodes in real-time such that capabilities of the positional information management system are improved, and wherein the navigation system performs functionality that receiving the position information in real-time permits such that the capabilities of the positional information management system are improved.

10. A non-transitory computer readable recording medium storing a mobile management program used in a mobile management system comprising a plurality of mobile nodes and a mobile management server connected to each other, the program causing a computer provided to the mobile management server to perform a method comprising:

receiving the status information transmitted from the mobile nodes;

storing the status information along with identifiers of each of the mobile nodes;

calculating a label in which the status information is bundled, via a label calculating function;

extracting characteristic parts showing parts with a high distribution density of the label in order from the part with the higher distribution density, via a characteristic part extracting function; and outputting information regarding the extracted characteristic part, wherein the label calculating function calculates a label which has the same value with higher probability when the status information of the mobile nodes are closer with respect to distance relation defined among the status information of the plurality of mobile nodes;

the label in which the status information is bundled is the label bundled by putting together the labels calculated by the plurality of label calculating functions which are formed using an outcome of a random variable generated according to a probability distribution;

the characteristic part extracting function stores a characteristic information set in which the characteristic parts showing the parts with high distribution density of the status information of the mobile nodes are clustered by using the label in which the status information is bundled; and wherein the characteristic parts extracted by the characteristic part extracting function are output, wherein analysis of the changes in the distribution, and calculation of the part with the particularly high distribution density are performed sufficient to provide output of the information in real-time, where the output of the information is positional information regarding the mobile nodes and displayed on the mobile node, wherein the mobile node comprises a motor vehicle having a navigation system, wherein the navigation system displays the received positional information regarding the mobile nodes in real-time such that capabilities of the navigation system are improved, and wherein the navigation system performs functionality that receiving the position information in real-time permits such that the capabilities of the navigation system are improved.

* * * * *